United States Patent
Takei

(10) Patent No.: US 10,310,442 B2
(45) Date of Patent: Jun. 4, 2019

(54) FRAME FOR FORMING IMAGE FORMING APPARATUS AND MANUFACTURING METHOD OF THE FRAME

(71) Applicant: CANON KABUSHIKI KAISHA, Tokyo (JP)

(72) Inventor: Yuhei Takei, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/197,459

(22) Filed: Nov. 21, 2018

(65) Prior Publication Data

US 2019/0086859 A1 Mar. 21, 2019

Related U.S. Application Data

(62) Division of application No. 14/973,930, filed on Dec. 18, 2015, now Pat. No. 10,168,658.

(30) Foreign Application Priority Data

Jan. 6, 2015 (JP) ................................. 2015-001113

(51) Int. Cl.
*G03G 15/00* (2006.01)
*G03G 21/16* (2006.01)
(Continued)

(52) U.S. Cl.
CPC ......... *G03G 21/1619* (2013.01); *B23K 31/02* (2013.01); *B23K 2101/24* (2018.08)

(58) Field of Classification Search
CPC ............................ G03G 21/1619; B23K 31/02
See application file for complete search history.

(56) References Cited

U.S. PATENT DOCUMENTS 6,078,764 A 6/2000 Akutsu
6,259,872 B1 * 7/2001 Fukunaga .............. G03G 15/00
399/107
(Continued)

FOREIGN PATENT DOCUMENTS

CN 102819203 A 12/2012
CN 103857267 A 6/2014
(Continued)

OTHER PUBLICATIONS

Japanese Office Action issued in corresponding Japanese Application No. 2015-001113 dated Sep. 18, 2018.
(Continued)

*Primary Examiner* — Kimberley S Wright
(74) *Attorney, Agent, or Firm* — Venable LLP

(57) ABSTRACT

A frame for forming an image forming apparatus for forming an image on a recording material includes a first stay, including a supporting portion for supporting the frame relative to an installation surface, for forming a bottom of the frame; a second stay, including a supporting portion for supporting the frame relative to the installation surface, for forming the bottom of the frame; a post to which the first stay and the second stay are secured; and a positioning portion, provided as a part of the post, for positioning the first stay and the second stay with respect to a horizontal plane direction. The first stay and the second stay are fixed to the post by welding.

7 Claims, 14 Drawing Sheets

(51) Int. Cl.
*B23K 31/02* (2006.01)
*B23K 101/24* (2006.01)

(56) References Cited

U.S. PATENT DOCUMENTS

| | | | |
|---|---|---|---|
| 7,274,893 B2* | 9/2007 | Morimoto | G03G 21/1619 108/50.01 |
| 7,418,219 B2 | 8/2008 | Woo et al. | |
| 8,099,017 B2* | 1/2012 | Takemoto | G03G 15/60 399/107 |
| 8,145,094 B2 | 3/2012 | Takemoto | |
| 8,190,054 B2 | 5/2012 | Murano | |
| 8,971,756 B2 | 3/2015 | Kawasumi | |
| 9,092,001 B2* | 7/2015 | Sato | G03G 21/1619 |
| 9,144,308 B2 | 9/2015 | Nakagaki | |
| 9,229,418 B2 | 1/2016 | Funayama et al. | |
| 9,261,854 B2 | 2/2016 | Kitan | |
| 9,523,958 B2* | 12/2016 | Onishi | G03G 21/1619 |
| 9,588,482 B2 | 3/2017 | Matsunami et al. | |
| 9,609,157 B2 | 3/2017 | Nagasaki | |
| 9,612,568 B2 | 4/2017 | Kiuchi et al. | |
| 2005/0196192 A1* | 9/2005 | Morimoto | G03G 21/1619 399/107 |
| 2008/0007935 A1 | 1/2008 | Kondo et al. | |
| 2008/0240781 A1 | 10/2008 | Murano | |
| 2009/0263155 A1* | 10/2009 | Murano | G03G 15/2064 399/107 |
| 2009/0274484 A1* | 11/2009 | Takemoto | G03G 21/16 399/107 |
| 2011/0157795 A1* | 6/2011 | Kim | G03G 15/605 361/679.01 |
| 2012/0308243 A1* | 12/2012 | Kawasumi | G03G 21/1619 399/13 |
| 2012/0320396 A1 | 12/2012 | Kurahashi et al. | |
| 2013/0129380 A1 | 5/2013 | Matsuno | |
| 2013/0195503 A1* | 8/2013 | Nakagaki | A47B 91/02 399/107 |
| 2013/0330100 A1 | 12/2013 | Funayama et al. | |
| 2014/0022978 A1 | 1/2014 | Chen et al. | |
| 2014/0151110 A1 | 6/2014 | Masaki et al. | |
| 2014/0203697 A1 | 7/2014 | Wada et al. | |
| 2014/0356021 A1* | 12/2014 | Sato | G03G 21/1619 399/107 |
| 2015/0063864 A1 | 3/2015 | Kitan | |
| 2015/0177676 A1* | 6/2015 | Murano | G03G 21/1619 399/107 |
| 2016/0195844 A1* | 7/2016 | Takei | G03G 21/1619 312/223.1 |
| 2016/0209801 A1* | 7/2016 | Nagasaki | G03G 21/1619 |
| 2016/0212284 A1* | 7/2016 | Nagasaki | H04N 1/00559 |
| 2016/0274530 A1* | 9/2016 | Tanabe | G03G 21/1619 |
| 2017/0010578 A1* | 1/2017 | Miyakawa | G03G 21/1619 |
| 2017/0017195 A1 | 1/2017 | Kiuchi et al. | |
| 2017/0060076 A1* | 3/2017 | Takei | G03G 21/1619 |
| 2017/0219992 A1* | 8/2017 | Yasui | G03G 21/1619 |

FOREIGN PATENT DOCUMENTS

| | | |
|---|---|---|
| JP | S50-42647 U | 12/1975 |
| JP | S57-64190 U | 10/1980 |
| JP | 2001-034021 A | 2/2001 |
| JP | 2004-170644 A | 6/2004 |
| JP | 2005-209711 A | 8/2005 |
| JP | 2005-250014 A | 9/2005 |
| JP | 2009-265540 A | 11/2009 |
| JP | 2010-204247 A | 9/2010 |
| JP | 2012-252277 A | 12/2012 |
| JP | 2013-109141 A | 6/2013 |
| JP | 2013-156569 A | 8/2013 |
| JP | 2014-235267 A | 12/2014 |

OTHER PUBLICATIONS

Chinese Office Action issued in corresponding Chinese Application No. 201610006229.5 dated Mar. 21, 2019.

* cited by examiner

FRAME FOR FORMING IMAGE FORMING APPARATUS AND MANUFACTURING METHOD OF THE FRAME

CROSS-REFERENCE TO RELATED APPLICATIONS

This application is a Divisional of U.S. patent application Ser. No. 14/973,930, filed Dec. 18, 2015, which claims priority to Japanese Application No. 2015-001113 filed on Jan. 6, 2015, the entire disclosures of which are both hereby incorporated by reference herein.

FIELD OF THE INVENTION AND RELATED ART

The present invention relates to a frame for forming an image forming apparatus such as a printer, a facsimile machine, a copying machine or a multi-function machine having a plurality of functions of these machines, and relates to a manufacturing method of the frame.

As a frame (structure) for forming the image forming apparatus, a structure in which a bottom plate is provided at a bottom of a main assembly frame in which an image forming portion is provided has been conventionally known. Further, a so-called three-point supporting structure in which a supporting portion for supporting the image forming apparatus is provided at three positions of the bottom plate has also been known (for example, Japanese Laid-Open Patent Application 2013-156569).

However, as described above, in the case where the frame for the image forming apparatus is constituted by providing the bottom plate at the bottom of the main assembly frame, a cost increases. For this reason, it would be considered that the bottom of the frame is constituted by using a plurality of stays in combination. However, in the case where the bottom is constituted by the plurality of stays and supporting portions are provided on separate stays, positional accuracy of the supporting portions provided at a plurality of positions lowers due to a mounting tolerance of the stays relative to the main assembly frame or a mounting tolerance of the supporting portions relative to the stays. That is, as in the conventional frame, in the case where the bottom is constituted by a single bottom left, such a tolerance is small, but in the case where the bottom is constituted by the plurality of stays, a variation is liable to generate in positional relationship among the respective stays or in positional relationship among the supporting portions provided on the stays. Further, when a degree of the variation in positional relationship among the supporting portions with respect to an up-down direction is large, even when an installation surface is flat, there is a possibility that an installed image forming apparatus leans.

SUMMARY OF THE INVENTION

The present invention has been accomplished in view of the above-described circumstances so as to realize a frame for an image forming apparatus and a manufacturing method of the frame which are capable of suppressing a variation in positional relationship among supporting portions with respect to an up-down direction even when a bottom of the image forming apparatus is constituted by a plurality of stays.

A principal object of the present invention is to enhance mounting accuracy of the plurality of stays forming the bottom.

According to an aspect of the present invention, there is provided a frame for forming an image forming apparatus for forming an image on a recording material, the frame comprising: a first stay, including a supporting portion for supporting the frame relative to an installation surface, for forming a bottom of the frame; a second stay, including a supporting portion for supporting the frame relative to the installation surface, for forming the bottom of the frame; a post to which the first stay and the second stay are secured; and a positioning portion, provided as a part of the post, for positioning the first stay and the second stay with respect to a horizontal plane direction, wherein the first stay and the second stay are fixed to the post by welding.

Further features of the present invention will become apparent from the following description of exemplary embodiments with reference to the attached drawings.

DESCRIPTION OF THE EMBODIMENTS

First Embodiment

First Embodiment of the present invention will be described using FIGS. 1 to 12. First, a general structure of an image forming apparatus in this embodiment will be described using FIGS. 1 and 2.

[Image Forming Apparatus]

Figure 1:
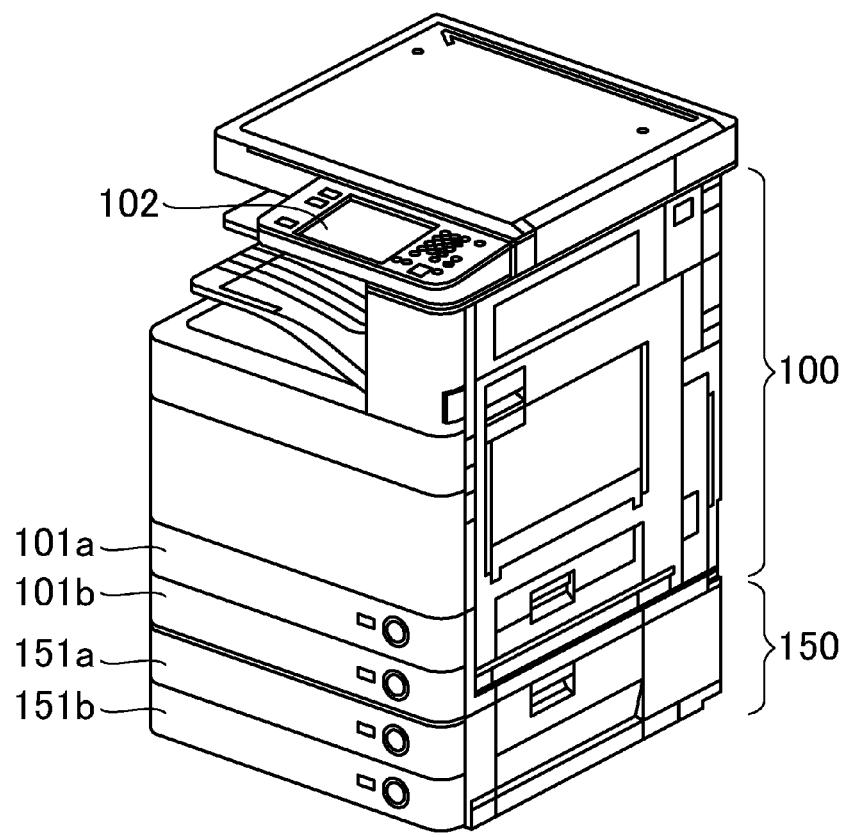
FIG. 1 is a perspective view of an image forming apparatus and a sheet feeding unit in First Embodiment.

An image forming apparatus 100 in this embodiment is a full-color printer employing an electrophotographic type. Such an image forming apparatus 100 is mountable on an upper surface (mounting surface) of an optional sheet (paper) feeding module 150 as shown in FIG. 1. The image forming apparatus 100 and the optional sheet feeding module 150 include two-stage sheet feeding cassette 101a, 101b and two-stage sheet feeding cassettes 151a, 151b, respectively. The respective sheet feeding cassettes accommodate recording materials (sheet materials such as sheets (papers) and OHP sheets) different in size and basis weight. It is possible to select the recording material to be used, through an operating portion 102 of the image forming apparatus 100 or an external terminal such as a personal computer connected with the image forming apparatus 100. In the following description, a side where a user operates the image forming apparatus 100 is referred to as a front side, and a back (rear) surface side of the image forming apparatus 100 is referred to as a rear surface. Left and right of the image forming apparatus 100 are those as seen from the front side.

The image forming apparatus 100 includes an image forming portion 103 for forming a toner image and a recording material feeding portion 104 for feeding a recording material onto which the toner image formed by the image forming portion 103 is transferred. The image forming portion 103 has a constituting of a so-called tandem type in which a plurality of process cartridges 105 as a plurality of image forming stations are arranged in a travelling direction of an intermediary transfer belt 106. At the image forming stations, toner images of yellow, magenta, cyan and black are formed, respectively.

In the image forming apparatus 100 in this embodiment as described above, the plurality (4 in this embodiment) of process cartridges 105 are detachably mounted to an apparatus main assembly 120. The respective process cartridges 105 have the same constitution, and therefore in the following, a leftmost process cartridge 105 will be described, and other process cartridges will be omitted from illustration of reference numerals or symbols and omitted from description.

The process cartridge 105 includes a photosensitive drum 107 which is a drum-shaped electrophotographic photosensitive member as an image bearing member, a charging roller 108, a developing device 109 and a drum cleaner 110. The photosensitive drum 107 is rotationally driven at a predetermined process speed by an unshown drum motor. A surface of the photosensitive drum 107 is electrically charged uniformly by the charging roller 108 as a charging means. The charged surface of the photosensitive drum 107 is irradiated with a laser beam on the basis of image information by an exposure device 111 as an imaging portion (exposure means), so that an electrostatic latent image is formed. The electrostatic latent image on the photosensitive drum 107 is developed as a developer image (toner image) by deposition of a toner by the developing device 109. The toner image on the photosensitive drum 107 is primary-transferred onto the intermediary transfer belt 106 as an intermediary transfer member by applying a primary transfer bias to between a primary transfer roller 112 as a primary transfer means and the photosensitive drum 107. A transfer residual toner remaining on the photosensitive drum 107 after the transfer is removed by the drum cleaner 110.

The above-described steps are executed in the respective process cartridges 105, so that the respective color toner images formed on the photosensitive drums 107 of the process cartridges 105 are superposedly transferred onto the intermediary transfer belt 106. Thus, a full-color toner images is formed on the intermediary transfer belt 106. The toner image on the intermediary transfer belt 106 is secondary-transferred onto the recording material fed, by the recording material feeding portion 104 described later, to a secondary transfer portion formed by the intermediary transfer belt 106 and a secondary transfer roller 113 as a secondary transfer means. The toner remaining on the intermediary transfer belt 106 after the transfer is removed by a belt cleaner 114.

The recording material feeding portion 104 is constituted by a plurality of feeding rollers, and picks up the recording material accommodated in the associated one of the sheet feeding cassettes 101a, 101b, 151a, 151b and then feeds the recording material to the secondary transfer portion. The feeding of the recording material to the secondary transfer portion is performed by being timed to the toner image on the intermediary transfer belt 106 by a registration roller pair 115. In an example shown in FIG. 2, the recording material is fed from the associated one of the sheet feeding cassettes 101a, 101b disposed at a lower portion of the apparatus main assembly, toward an upper portion of the apparatus main assembly. For this purpose, the recording material feeding portion 104 is disposed along a substantially up-down direction (vertical direction) in one side (right side as seen from the front side of the image forming apparatus) of the apparatus main assembly.

The recording material on which the toner image is transferred at the secondary transfer portion is heated and pressed by a fixing device 116, so that the toner image is fixed. The recording material on which the toner image is fixed is discharged on a discharge tray 117.

Here, as described above, in the image forming apparatus 100, image formation and feeding of the recording material are effected. For this reason, when a frame structure (frame) of the image forming apparatus 100 is distorted, an image defect and an improper operation generate in some cases. On the other hand, in the optional sheet feeding module 150, even when the frame is somewhat distorted, the distorted frame has no influence on a function of feeding the recording material and delivering the recording material to the image forming apparatus. Accordingly, suppression of distortion of the frame structure of the image forming apparatus 100 is important for the purpose of suppressing the image defect and the improper operation.

[Frame Structure]

Figure 3:
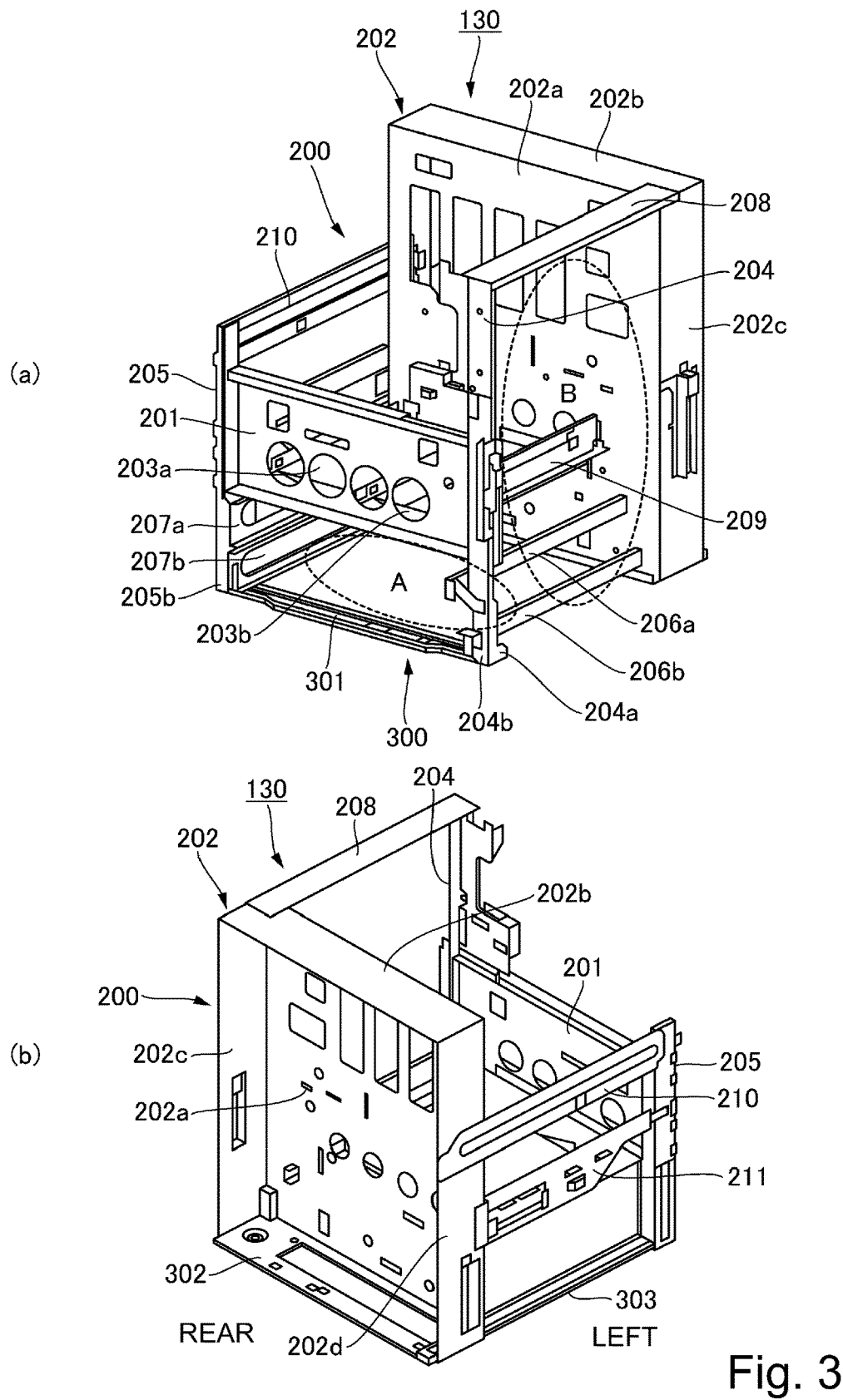
In FIG. 3, (a) is a perspective view of a frame (structure) for the image forming apparatus as seen from above in a front side, and (b) is a perspective view of the frame for the image forming apparatus as seen from above in a rear side, in the First Embodiment.

A frame structure 130 as an image forming apparatus frame (structure) constituting the apparatus main assembly 120 will be described using FIGS. 3 and 4. The frame structure 130 includes a main assembly frame 200 and a bottom (portion) 300. Inside the main assembly frame 200, the image forming portion 103 and the recording material feeding portion 104 which are as described above are disposed. The bottom 300 is disposed at a lower position of the main assembly frame 200 with respect to the up-down direction (vertical direction) and in the neighborhood of an installation surface (mounting surface). First, a constitution of the main assembly frame 200 will be described.

[Main Assembly Frame]

The main assembly frame 200 is constituted by connecting, as a plurality of frame members disposed with respect to the up-down direction, a front-side plate 201, a rear-side plate 202 (side plate), a left-side post 205 (first post) and a right-side post 204 (second post) via various stays and side plates. First, the front-side plate 201 and the rear-side plate 202 are connected by main bases 203a, 203b to which the exposure device 111 is to be mounted. The front-side plate 201 is connected to end supported by the right-side post 204 at a right end thereof and is connected to and supported by the left-side post 205 at a left end thereof. The rear-side plate 202 is constituted by a side plate portion 202a disposed with respect to the up-down direction, and an upper plate portion 202b, a right plate portion 202c and a left plate portion 202d which are provided so as to project from an upper end, a right end and a left end, respectively, of the side plate portion 202a. In a space defined by these plate portions 202a to 202d, various electrical components such as a motor for driving the image forming apparatus 200 are to be disposed.

The right-side post 204 is disposed so as to extend to the neighborhood of the installation surface in a downward direction and includes a first side wall 204a and a second side wall 204b which are parallel with respect to the up-down direction and which are perpendicular to each other. The left-side post 205 is disposed so as to extend to the neighborhood of the installation surface in a downward direction and includes a first side wall 205a and a second side wall 205b which are parallel with respect to the up-down direction and which are perpendicular to each other. The first side walls 204a, 205a are disposed opposed to each other so that wall surfaces thereof are perpendicular to a left-right direction, and the second side walls 204b, 205b are disposed so that wall surfaces thereof are perpendicular to the front-rear direction and oppose the rear-side plate 202 and so that the second side walls 204b, 205b are in the same plane parallel to the left-right direction.

In the neighborhood of the installation surface between the right-side post 204 and the rear-side plate 202, the post 204 and the plate 202 are connected by lower right stays 206a, 206b. The lower right stays 206a, 206b are provided with rails for not only regulating positions of the right-side post 204 and the rear-side plate 202 with respect to the front-rear direction but also taking the sheet feeding cassettes 101a, 101b in and out. The lower right stays 206a, 206b are disposed inside (leftward) the first side wall 204a of the right-side post 204 to ensure a space in which the recording material fed from the above-described optional sheet feeding module 150 to the recording material feeding portion 104.

In the neighborhood of the installation surface between the left-side post 205 and the rear-side plate 202, the post 204 and the plate 202 are connected by lower left side plates 207a, 207b. The lower left side plates 207a, 2067 are disposed at positions opposing the lower right stays 206a, 206b and are provided with rails for not only regulating positions of the left-side post 205 and the rear-side plate 202 with respect to the front-rear direction but also taking the sheet feeding cassettes 101a, 101b in and out. Accordingly, the sheet feeding cassettes 101a, 101b are mountable in and demountable from the apparatus main assembly 120 by the rails provided on the lower right stays 106a, 106b and the lower left side plates 207a, 207b.

The right-side post 204 and the rear-side plate 202 are connected at an upper end by an upper right stay 208 and connected at an intermediary portion with respect to the up-down direction by an intermediary right stay 209. The left-side post 205 and the rear-side plate 202 are connected at an upper end by an upper left stay 210 and connected at an intermediary portion with respect to the up-down direction by an intermediary left stay 211. These stays 208 to 211 regulate positions of the right-side post 204, the left-side post 205 and the rear-side plate 202 with respect to the front-rear direction.

The respective posts, stays, side plates and the like which constitute the main assembly frame 200 as described above are connected to each other by connecting members such as screws or by welding or the like. By employing such a constitution, between the front-side plate 201 and the bottom 300, a lower front opening A through which the two-stage sheet feeding cassettes 101a, 101b are mountable and demountable is provided. Further, as described above, the recording material feeding portion 104 is disposed in the right side, and therefore in the case where the recording material jammed at the recording material feeding portion 104 is removed or in the like case, a right surface opening B through which the user has access to the inside of the image forming apparatus 100 is provided.

[Bottom (Portion)]

A structure of the bottom (portion) 300 will be described. The bottom 300 is constituted by a plurality of stays 301 (first stay), 303 (second stay), 302 (third stay) fixed at a lower portion of the main assembly frame 200. These stays 301, 303, 302 are provided with three supporting portions 311 (first supporting portion), 313 (second supporting portion), 312 (third supporting portion) for supporting the image forming apparatus 100 relative to the installation surface. In the case of this embodiment, the installation surface of the image forming apparatus 100 is the upper surface of the sheet feeding module 150, but in the case where the image forming apparatus 100 is disposed directly on a floor surface, the floor surface is the installation surface. In this embodiment, a so-called 3-point supporting structure in which the image forming apparatus 100 is supported by the three supporting portions 311, 312, 313 only.

Of the plurality of stays, the lower front stay 301 as the first stay is provided with the first supporting portion 311 of the three supporting portions. Of the plurality of stays, the rear bottom stay 302 as the third stay is provided with the third supporting portion 312 of the three supporting portions. Of the plurality of stays, the lower left stay 303 as the second stay is provided with the second supporting portion 313 of the three supporting portions. A positional relationship among the first to third stays is not limited thereto, but may also be any combination of the stays with the supporting portions. In this embodiment, the lower front stay 301 as the first stay is disposed in the neighborhood of the installation surface between the right-side post 204 and the left-side post 205, so that positions of these posts are regulated with respect to a widthwise direction (left-right direction). The rear bottom stay 302 as the third stay is disposed at the bottom of the rear-side plate 202, so that a bottom of the main assembly frame at a rear portion is formed. The lower left stay 303 as the second stay connects the left-side post 205 and the rear bottom stay 302 in the neighborhood of the installation surface.

[Arrangement of Supporting Portions]

Figure 2:
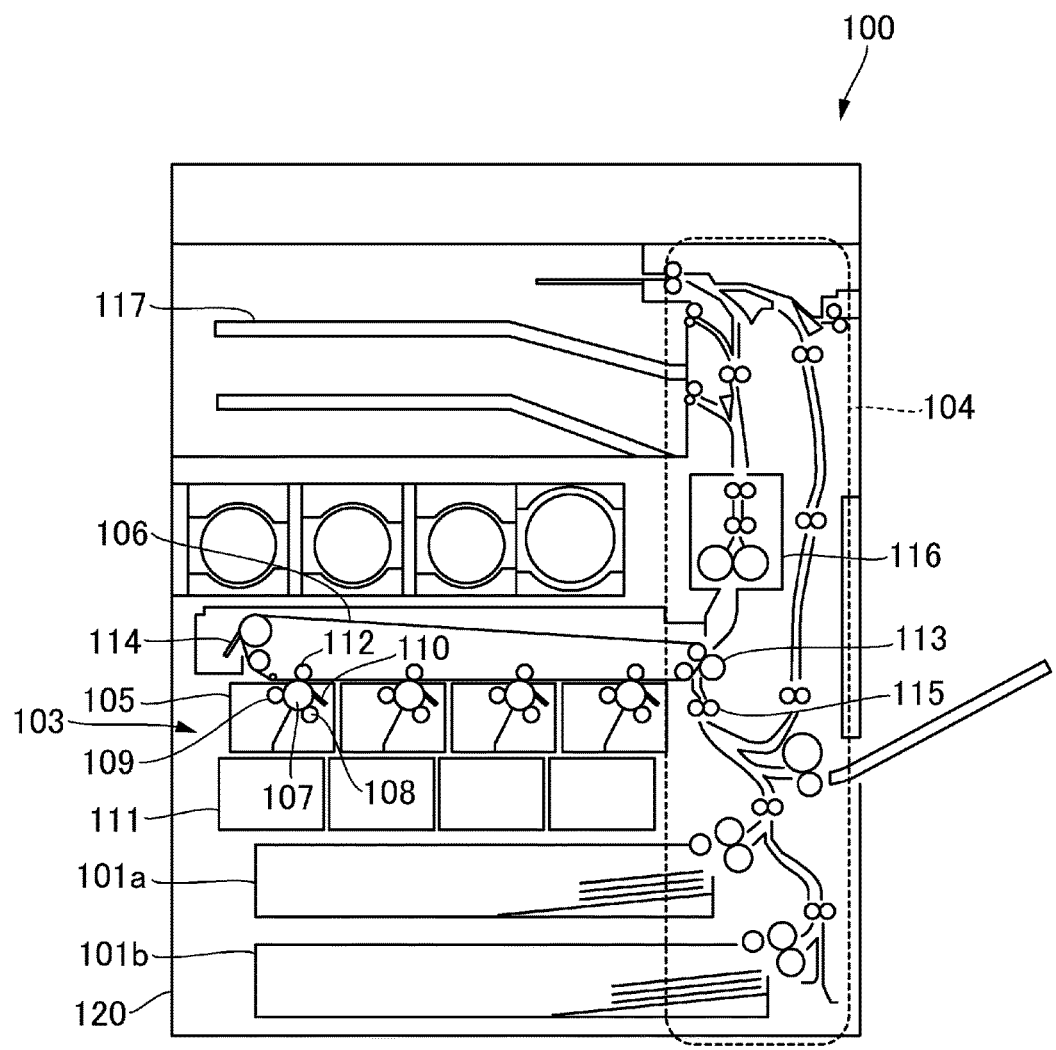
FIG. 2 is a schematic view of the image forming apparatus in the First Embodiment.

Arrangement positions of the three supporting portions 311, 312, 313 will be described using FIG. 4. First, the first supporting portion 311 and the third supporting portion 312 are provided in the neighborhood of a right front corner and a right rear corner, respectively, of the bottom 300 so as to sandwich the recording material feeding portion 104 (FIG. 2). The second supporting portion 313 is disposed in the neighborhood of a left end center of the bottom 300 so that the center of gravity G of the image forming apparatus 100 is positioned inside a line (broken line) L connecting the three supporting portions 311, 312, 313.

As described above, the various electrical components such as the driving portion which is a heavy object, and an electrical portion are disposed on the rear-side plate 202 constituting a rear side of the image forming apparatus 100. The recording material feeding portion 104 is disposed in the right side of the image forming apparatus 100. For this reason, the position of the center of gravity G is positioned in a right rear side of a center of the image forming apparatus 100. That is, the center of gravity G of the image forming apparatus 100 is in a position closest to the right-rear-side third supporting portion 312 of the three supporting portions 311, 312, 313. In the case where the image forming apparatus 100 is installed alone on the installation surface, the supporting portions 311, 312, 313 disposed at three positions contact the installation surface, and therefore an attitude of the image forming apparatus 100 is uniquely determined by heights of the three supporting portions 311, 312, 313. Therefore, by supporting the image forming apparatus 100 at the 3 positions (points), even in the case where a degree of flatness of the installation surface of the image forming apparatus 100 is low, twisting and distortion of the image forming apparatus 100 can be suppressed.

[Stays Constituting Bottom]

A structure of each of the 3 stays 301, 302, 303 constituting the bottom 300 will be described. First, the lower front stay 301 disposed in the front side of the image forming apparatus 100 will be described using (a) and (b) of FIG. 5. The lower front stay 301 is constituted by a combination of a first plate member 301a and a second plate member 301b each formed by subjecting a metal plate to bending. As shown in (b) of FIG. 5, the first plate member 301a is formed by being bent in a substantially crank shape at each of end portions with respect to the widthwise direction perpendicular to a longitudinal direction. The second plate portion 301b is formed by being bent in one direction at each of the widthwise end portions. Then, the first plate portion 301a and the second plate portion 301b are combined so as to form a closed cross-section as shown in (b) of FIG. 5, and are connected with each other by welding. By constituting the lower front stay 301 so as to form the closed cross-section, geometrical moment of inertia can be made large, so that a degree of deformation of the image forming apparatus 100 due to the weight of the image forming apparatus 100 can be remarkably suppressed.

By subjecting the second plate member 301b disposed in a lower surface side of the lower front stay 301 to drawing, the first supporting portion 311 is formed integrally with the lower front stay 301. That is, as shown in (a) of FIG. 5, a part of the longitudinal end portion of the second plate member 301b is subjected to the drawing so as to be pushed out downward, so that at a lower surface of the second plate member 301b, the first supporting portion 311 projecting downward more than another portion is formed.

Figure 6:
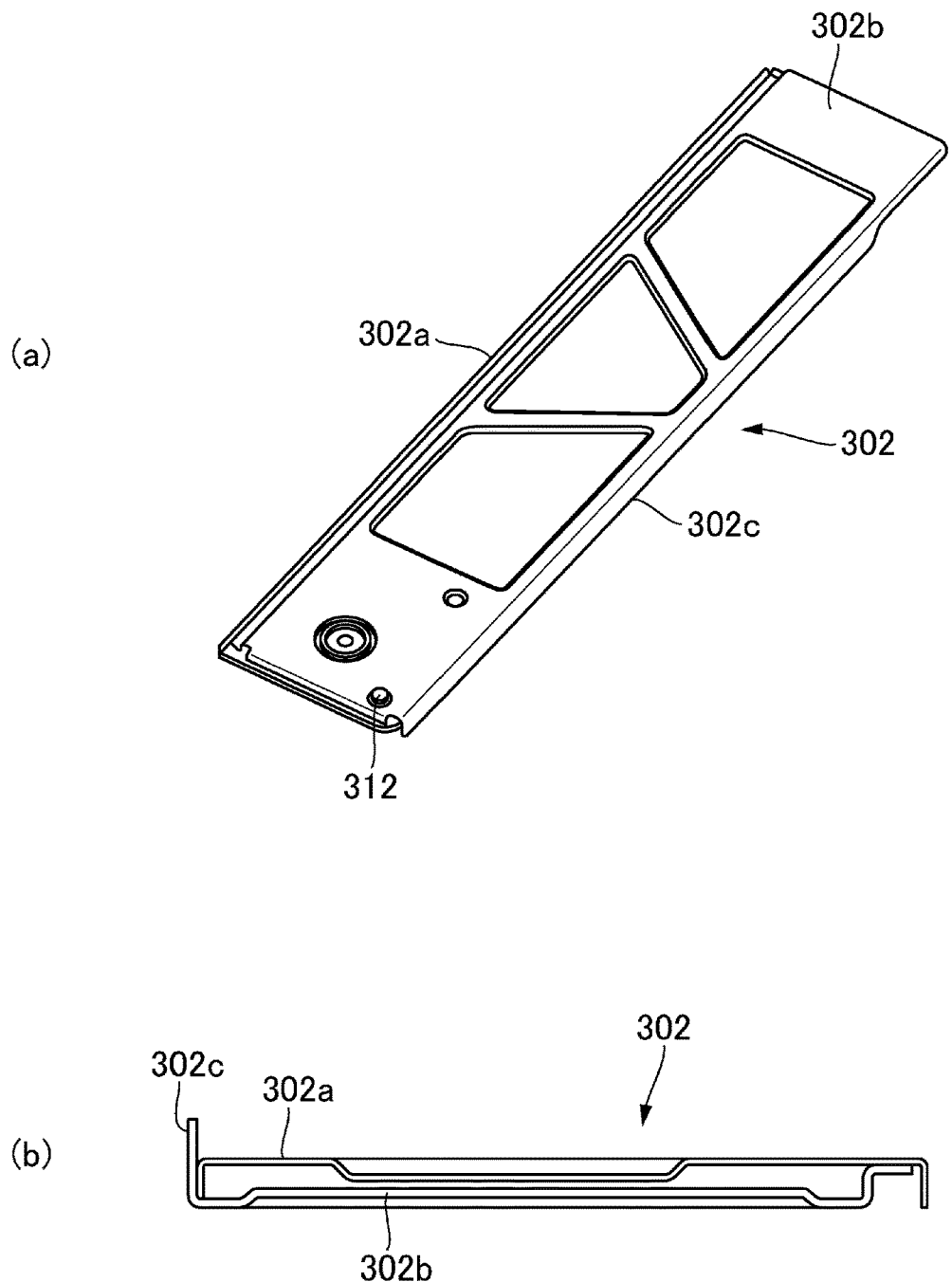
In FIG. 6, (a) is a perspective view of a rear bottom stay, and (b) is a sectional view of the rear bottom stay, in the First Embodiment.

Next, the rear bottom stay 302 disposed in the rear side of the image forming apparatus 100 will be described using (a) and (b) of FIG. 6. The rear bottom stay 302 is constituted by a combination of a first plate member 302a and a second plate member 302b each formed by subjecting a metal plate to bending. As shown in (b) of FIG. 6, the first plate member 302a is formed by being not only depressed at an intermediary portion but also bent in one direction at each of end portions with respect to the widthwise direction perpendicular to a longitudinal direction. The second plate portion 302b is formed by being bent in a substantially crank shape at each of the widthwise end portions. One widthwise end portion as the front-side portion of the second plate member 302b in a disposed state of the second plate member 302b disposed in a lower surface side of the rear bottom stay 302 constitutes a projected plate portion 302c projected upward more than the first plate member 302a disposed in an upper surface side in a state in which the first plate member 302a and the second plate member 302b are disposed in combination. Then, the first plate portion 302a and the second plate portion 302b are combined so as to form a closed cross-section as shown in (b) of FIG. 6, and are connected with each other by welding.

By subjecting the second plate member 302b disposed in a lower surface side of the rear bottom stay 302 to drawing, the third supporting portion 312 is formed integrally with the rear bottom stay 302. That is, as shown in (a) of FIG. 6, a part of the longitudinal end portion of the second plate member 302b is subjected to the drawing so as to be pushed out downward, so that at a lower surface of the second plate member 302b, the third supporting portion 312 projecting downward more than another portion is formed.

Next, the lower left stay 303 disposed in the left side of the image forming apparatus 100 will be described using (a), (b) and (c) of FIG. 7. The lower left stay 303 is constituted by a combination of a first plate member 303a and a second plate member 303b each formed by subjecting a metal plate to bending. As shown in (c) of FIG. 7, the first plate member 303a is formed by being not only depressed at an intermediary portion but also bent in one direction at each of end portions with respect to the widthwise direction perpendicular to a longitudinal direction. The second plate portion 303b is formed by being bent in one direction at one widthwise end portion and by being bent in a substantially crank shape at the other widthwise end portion. Then, the first plate portion 303a and the second plate portion 303b are combined so as to form a closed cross-section as shown in (c) of FIG. 7, and are connected with each other by welding.

The second supporting portion is constituted separately from the lower left stay 303 and is fixed to the lower left stay 303. In a state in which the second supporting portion 313 is not fixed to the lower left stay 303 but is positioned with respect to an in-plane direction perpendicular to the up-down direction, the second supporting portion 313 is disposed movably in the up-down direction. In the case of this embodiment, the lower left stay 303 is disposed along the front-rear direction, and therefore the second supporting portion 313 is disposed movably in the front-rear direction in a state in which the second supporting portion 313 is positioned relative to the lower left stay 303 with respect to the front-rear direction and the left-right direction.

Specifically, the lower left stay 303 includes a pair of side surfaces 303c, 303d which are parallel to the up-down direction and which are parallel to each other. The side surface 303c in one side is an outside surface of the bent portion formed by bending the first plate member 303a at one widthwise end portion, and the other side surface 303d is an outside surface of the bent portion formed by bending the second plate member 303b at the other widthwise end portion.

The second supporting portion 313 includes a pair of side wall portions 313a, 313b, a connecting portion 313c and a contact portion 313d. The pair of side wall portions 313a, 313b are disposed opposed to the pair of side surfaces 303c, 303d, respectively. The connecting portion 313c connects lower end portions of the pair of the side wall portions 313a, 313b. The contact portion 313d is provided on the connecting portion 313c and is contacted to the installation surface. The thus-constituted second supporting portion 313 includes the pair of side wall portions 313a, 313b and the connecting portion 313c each formed by bending the metal plate. By subjecting the connecting portion 313c to the drawing, the contact portion 313d is formed integrally with the connecting portion 313d. That is, as shown in (c) of FIG. 7, a part of the connecting portion 313c is subjected to the drawing so as to be pushed out downward, so that at a lower surface of the connecting portion 313c, the contact portion 313d projecting downward more than another portion is formed.

The above-described first supporting portion 311 and the third supporting portion 312 are formed so that each of contact surfaces with the installation surface has a substantially circular shape. On the other hand, the contact portion 313d constituting the second supporting portion 313 is formed so that an area of the contact surface thereof is larger than an area of each of the contact surfaces of the first supporting portion 311 and the third supporting portion 312. Specifically, the contact surface of the contact portion 313d has such a shape that end portions of a flat surface extending in the front-rear direction which is an arrangement direction of the lower left stay 303 are formed in an arcuate shape. This is because the two supporting portions 311, 312 are disposed in the right side of the image forming apparatus 100 and on the other hand, only one supporting portion 313 is disposed in the left side of the image forming apparatus 100. That is, an installation area in a side where the single supporting portion is disposed is made large, so that stability of the image forming apparatus 100 relative to the installation surface is improved. As a result, for example, even in the case where such an external force that the user puts his (her) weight on the image forming apparatus 100 acts on the image forming apparatus 100, it is possible to prevent the image forming apparatus 100 from leaning with reliability.

Figure 7:
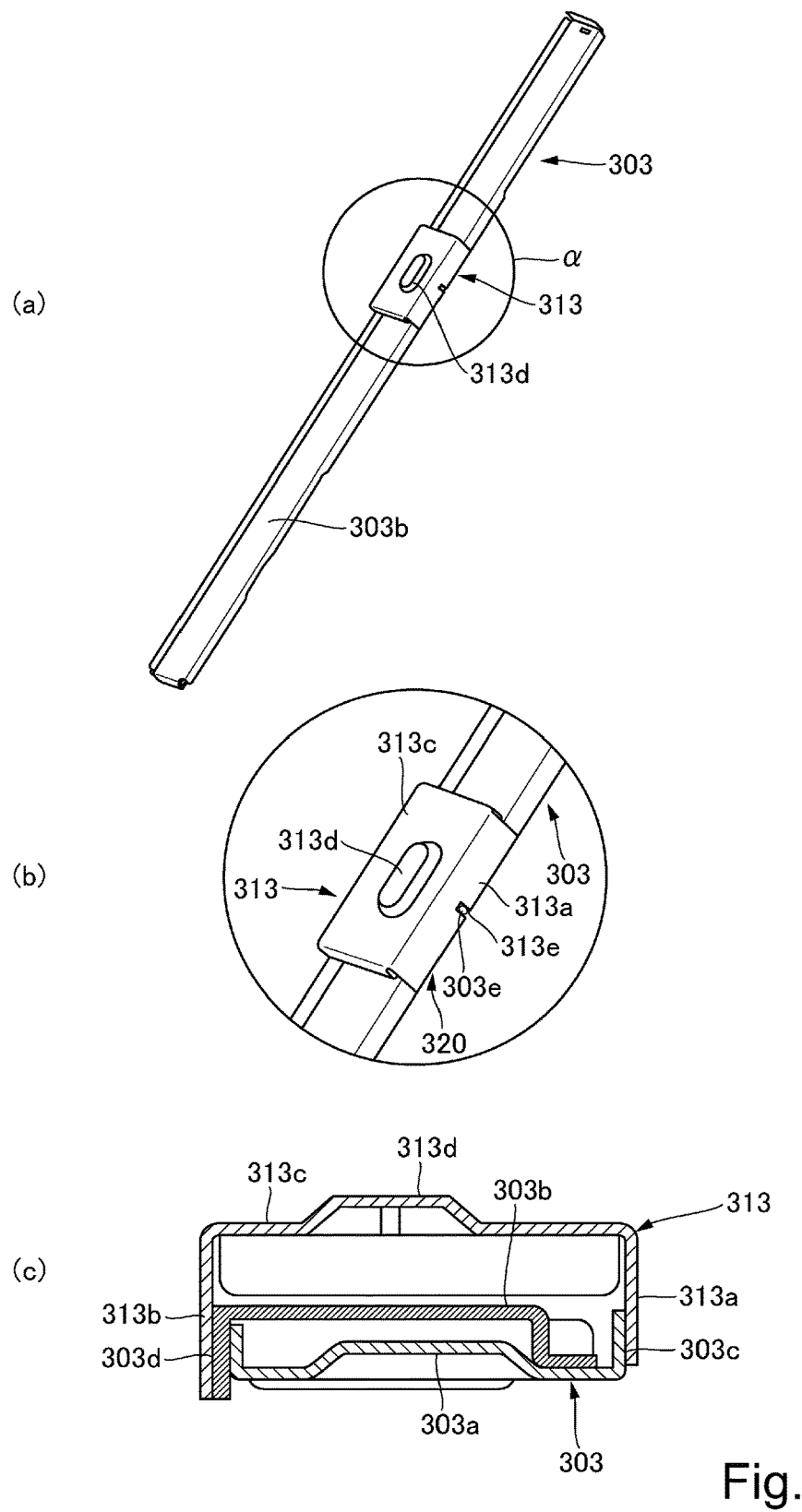
In FIG. 7, (a) is a perspective view of a lower left stay, (b) is an enlarged view of an α portion in (a) of FIG. 7, and (c) is a sectional view of the lower left stay, in the First Embodiment.

The lower left stay 303 includes a projected portion 303e as an engaging portion as shown in (b) of FIG. 7. The projected portion 303e is formed so as to project from each of the pair of side surfaces 303c, 303d. On the other hand, the second supporting portion 313 is provided with a cut-away portion 313e as a portion-to-be-engaged engaging with the projected portion 303e. The cut-away portion 313e is formed in each of the pair of side wall portions 313a, 313b and is cut away from each of upper end portions of the side wall portions 313a, 313b with respect to the up-down direction, so that the projected portion 303e can enter the cut-away portion 313e.

Assembling of the second supporting portion 313 with the lower left stay 303 is made in the following manner. First, the second supporting portion 313 is disposed so that the pair of side wall portions 313a, 313b sandwich the pair of side surfaces 303c, 303d of the lower left stay 303 and so that the cut-away portion 313e and the projected portion 303e are aligned with each other. Then, the second supporting portion 313 is moved in an upward direction relative to the lower left stay 303, so that not only the projected portion 303e enters the cut-away portion 313e but also the pair of side wall portions 313a, 313b oppose the pair of side surfaces 303c, 303d, respectively. As a result, the second supporting portion 313 is positioned relative to the lower left stay 303 with respect to the in-plane direction in a state in which the second supporting portion 313 is not fixed to the lower left stay 303. In this embodiment, a stay-side positioning portion 320 (positioning portion) is constituted by the pair of side surfaces 303c, 303d, the pair of side wall portions 313a, 313b, the projected portion 303e and the cut-away portion 313e.

That is, the pair of side wall portions 313a, 313b and the pair of side surfaces 303c, 303d are contacted to or close to each other, the second supporting portion 313 is positioned relative to the lower left stay 313 with respect to a direction (left-right direction), of the in-plane direction, perpendicular to the pair of side surfaces 303c, 303d. Further, by engagement between the cut-away portion 313e and the projected portion 303e, the second supporting portion 313 is positioned relative to the lower left stay 313 with respect to a direction (front-rear direction), of the in-plane direction, parallel to the pair of side surfaces 303c, 303d. At this time, the projected portion 303e is movable relative to the cut-away portion 313e in the up-down direction, and therefore the second supporting portion 313 is movable relative to the lower left stay 303 in the up-down direction in a state in which the second supporting portion 313 is positioned with respect to the front-rear direction and the left-right direction. The second supporting portion 313 is fixed to the lower left stay 303 by welding after positional adjustment (height adjustment) of the three supporting portions 311, 312, 313 with respect to the up-down direction is made as described later.

[Positioning and Fastening of Stays to Main Assembly Frame]

Figure 8:
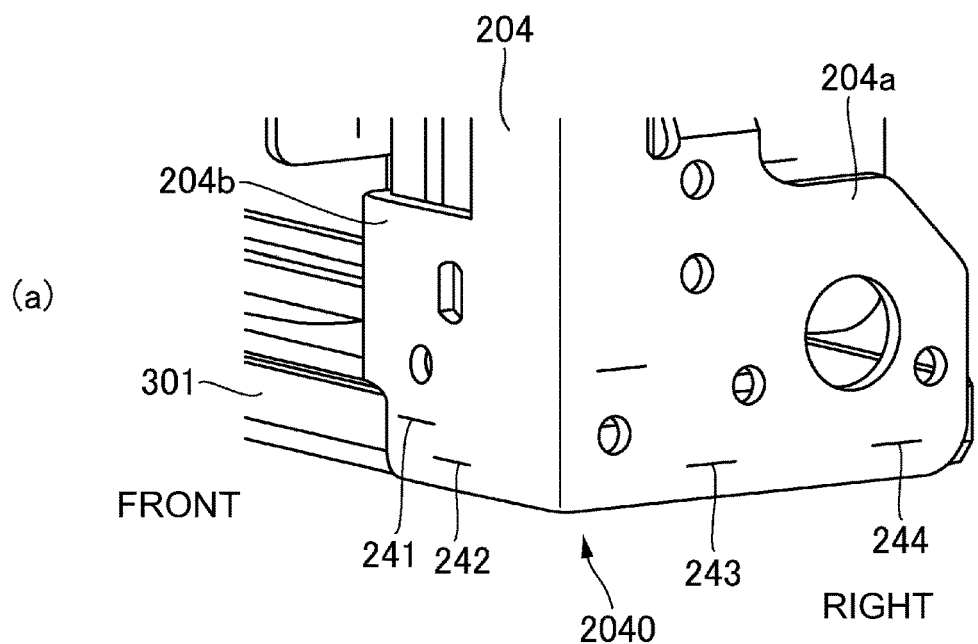
In FIG. 8, (a) is a perspective view of a connecting portion between the lower front stay and a rear-side post as seen from above, and (b) is a perspective view of a connecting portion between the lower front stay and the rear-side post as seen from below, in the First Embodiment.
Figure 8:
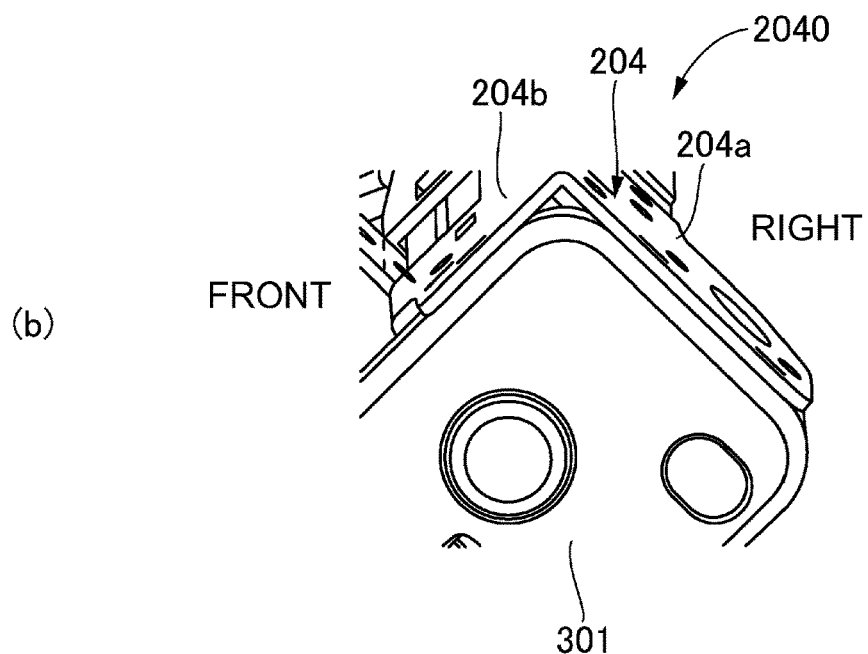

Next, positioning and fastening of the above-described 3 stays 301, 302, 303 to the main assembly frame 200 will be described using FIGS. 8 to 10 while making reference to FIG. 4. The lower front stay 301 and the rear bottom stay 302 as the first stay and the third stay, respectively, are disposed movably in the up-down direction in a state in which these stays are not fixed to the main assembly frame 200 but are positioned relative to the main assembly frame 200 with respect to the in-plane direction (horizontal plane direction) perpendicular to the up-down direction. On the other hand, the lower left stay 303 as the second stay is, after being fixed to the main assembly frame 200 with respect to the up-down direction and the in-plane direction, disposed movably in the up-down direction in a state in which the second supporting portion 313 is positioned relative to the lower left stay 303 with respect to the in-plane direction. Specific description will be made below.

First, the positioning and the fastening of the lower front stay 301 will be described using FIGS. 8 and 9. In FIG. 8, (a) and (b) are perspective views each showing a state in which the lower front stay 301 is positioned relative to the right-side post 204 and is fastened to the right-side post 204. The right-side post 204 includes, as described above, the first side wall 204a and the second side wall 204b which are parallel to the up-down direction and which are perpendicular to each other. The lower front stay 301 is disposed in contact with or close to only the first side wall 204a and the second side wall 204b at a right end portion thereof. The first side wall 204a is disposed in parallel to the front-rear direction, and the second side wall 204b is disposed in parallel to the left-right direction. For this reason, the right end portion of the lower front stay 301 is disposed movably in the up-down direction in a state in which the right end portion is positioned by the first side wall 204a and the second side wall 204b with respect to the front-rear direction and the left-right direction. In this embodiment, a first positioning portion 2040 is constituted by the first side wall 204a and the second side wall 204b. That is, the first positioning portion 2040 positions the lower front stay 301 with respect to the left-right direction (horizontal plane direction) but does not position the lower front stay 301 with respect to the up-down direction (vertical direction). The right end portion of the lower front stay is, as described later, fixed to the right-side post 204 at fastening portions 241 to 244 by welding after the positioned adjustment (height adjustment) of the three supporting portions 311, 312, 313 with respect to the up-down direction.

Figure 9:
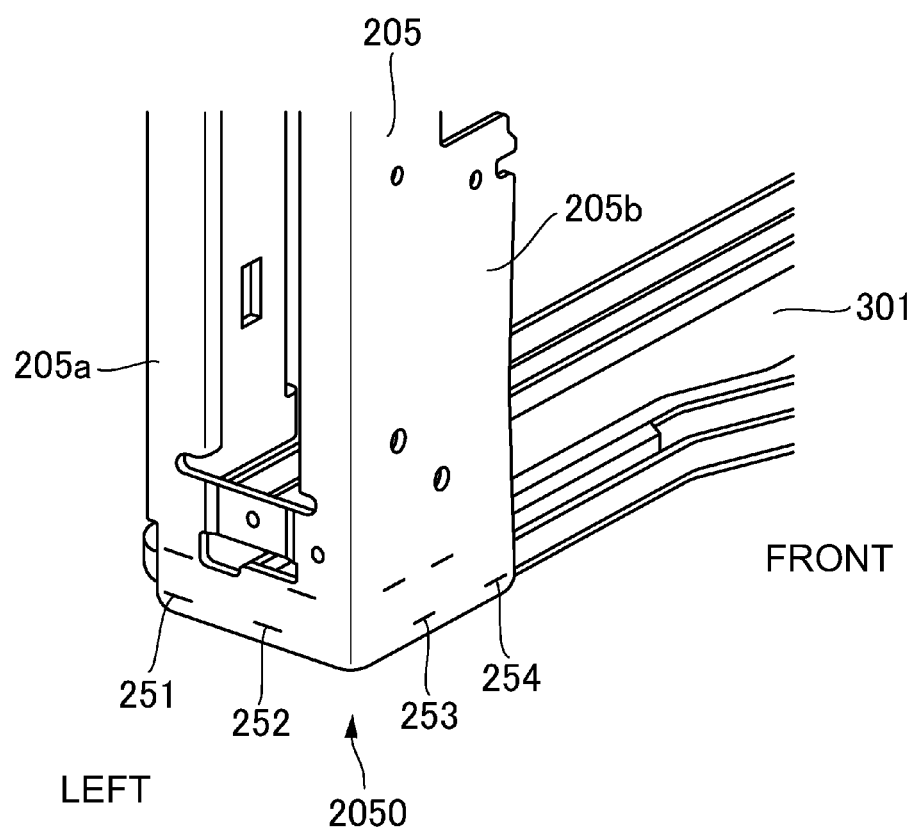
FIG. 9 is a perspective view of a connecting portion between the lower front stay and a left-side post as seen from above in the First Embodiment.
Figure 10:
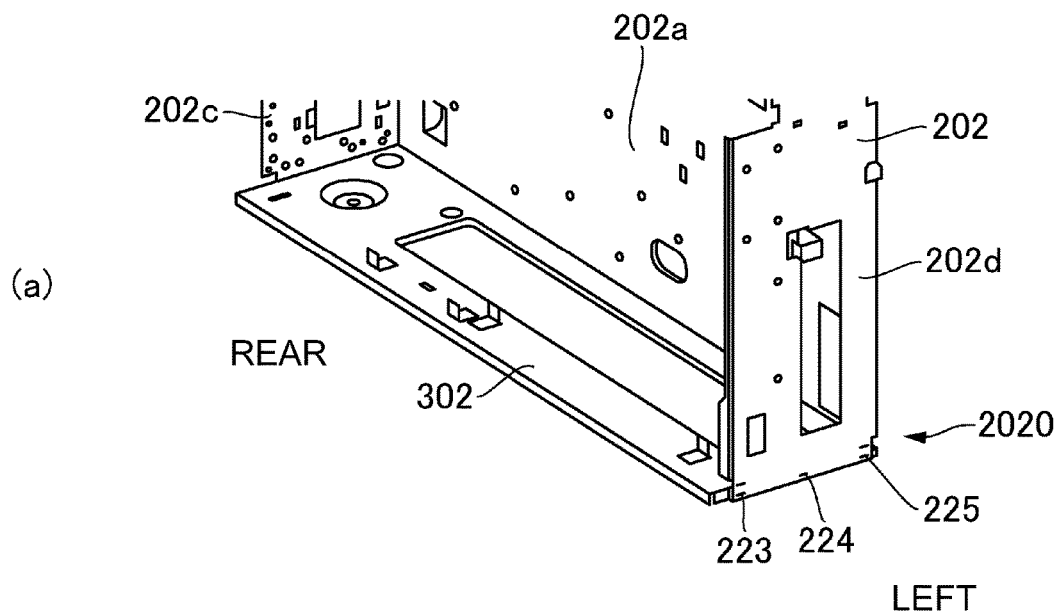
In FIG. 10, (a) is a perspective view of a connecting portion between the rear bottom stay and a left-side plate as seen from a rear side, and (b) is a perspective view of the connecting portion between the rear bottom stay and the left-side plate as seen from a front side, in the First Embodiment.
Figure 10:
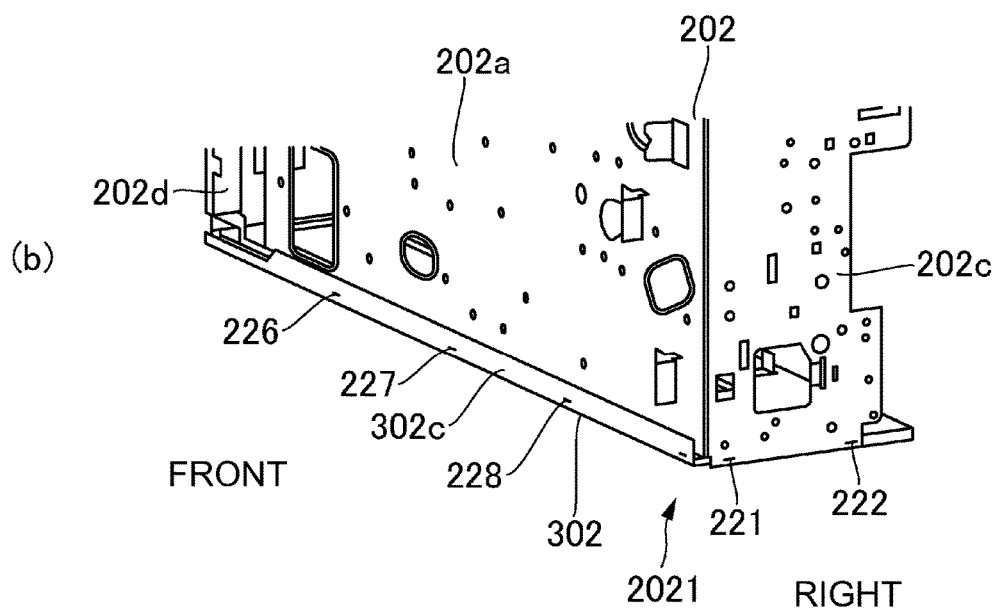

FIG. 9 is a perspective view showing a state in which the lower front stay 301 is positioned relative to the left-side post 205 and is fastened to the left-side post 205. The left-side post 205 includes, as described above, the first side wall 205a and the second side wall 205b which are parallel to the up-down direction and which are perpendicular to each other. The lower front stay 301 is disposed in contact with or close to only the first side wall 205a and the second side wall 205b at a left end portion thereof. The first side wall 205a is disposed in parallel to the front-rear direction, and the second side wall 205b is disposed in parallel to the left-right direction. For this reason, the left end portion of the lower front stay 301 is disposed movably in the up-down direction in a state in which the right end portion is positioned by the first side wall 205a and the second side wall 205b with respect to the front-rear direction and the left-right direction (horizontal plane direction). In this embodiment, a second positioning portion 2050 is constituted by the first side wall 205a and the second side wall 205b. The left end portion of the lower front stay 301 is, as described later, fixed to the left-side post 205 at fastening portions 251 to 254 by welding after the positioned adjustment (height adjustment) of the three supporting portions 311, 312, 313 with respect to the up-down direction. That is, the second positioning portion 2050 positions the lower front stay 301 with respect to the left-right direction (horizontal plane direction) but does not position the lower front stay 301 with respect to the up-down direction (vertical direction). In this way, the lower front stay 301 is disposed movably in the up-down direction in a state in which the lower front stay 301 is positioned relative to the right-side post 204 and the left-side post 205 with respect to the front-rear direction and the left-right direction, and after the height adjustment of the respective supporting portions, is fixed to the right-side post 204 and the left-side post 205 by welding.

Next, the positioning and the fastening of the rear bottom stay 302 will be described using FIG. 10. In FIG. 10, (a) and (b) are perspective views each showing a state in which the rear bottom stay 302 is positioned relative to the rear-side plate 202 and is fastened to the rear-side plate 202. The right-side post 204 includes, as described above, the side plate portion 202a, and the right plate portion 202c and the left plate portion 202d which are projected rearward from right and left end portions, respectively, of the side plate portion 202a. Here, the side plate portion 202 is disposed in parallel to the left-right direction, and the right plate portion 202c and the left plate portion 202d and disposed in parallel to the front-rear direction. Accordingly, each of a combination of the side plate portion 202a and the right plate portion 202c and a combination of the side plate portion 202a and the left plate portion 202d provides a relationship between the first side wall and the second side wall which are perpendicular to each other. At a front-side end portion of the rear bottom stay 302, as described above, the projected plate portion 302c is formed.

The rear bottom stay 302 is disposed in contact with or closely to only the right portion 202c and the left plate portion 202d of the rear-side plate 202 at end portions thereof with respect to the left-right direction. That is, the rear bottom stay 302 is disposed in contact with or closely to only the side plate portion 202a, the right plate portion 202c and the left plate portion 202d. For this reason, the rear bottom stay 302 is disposed movably in the up-down direction in a state in which the rear bottom stay 302 is positioned by the side plate portion 202a, the right plate portion 202c and the left plate portion 202d with respect to the front-rear direction and the left-right direction (horizontal plane direction). In this embodiment, a third positioning portion 2020 is constituted by the side plate portion 202a and the left plate portion 202d, and a fourth positioning portion 2021 is constituted by the side plate portion 202a and the right plate portion 202c. That is, the third and fourth positioning portions position the rear bottom stay 302 with respect to the left-right direction (horizontal plane direction) but does not position the lower front stay 301 with respect to the up-down direction (vertical direction). The rear bottom stay 302 is, as described later, fixed to the rear-side plate 202 at fastening portions 221 to 228 by welding after the positioned adjustment (height adjustment) of the three supporting portions 311, 312, 313 with respect to the up-down direction.

Figure 4:
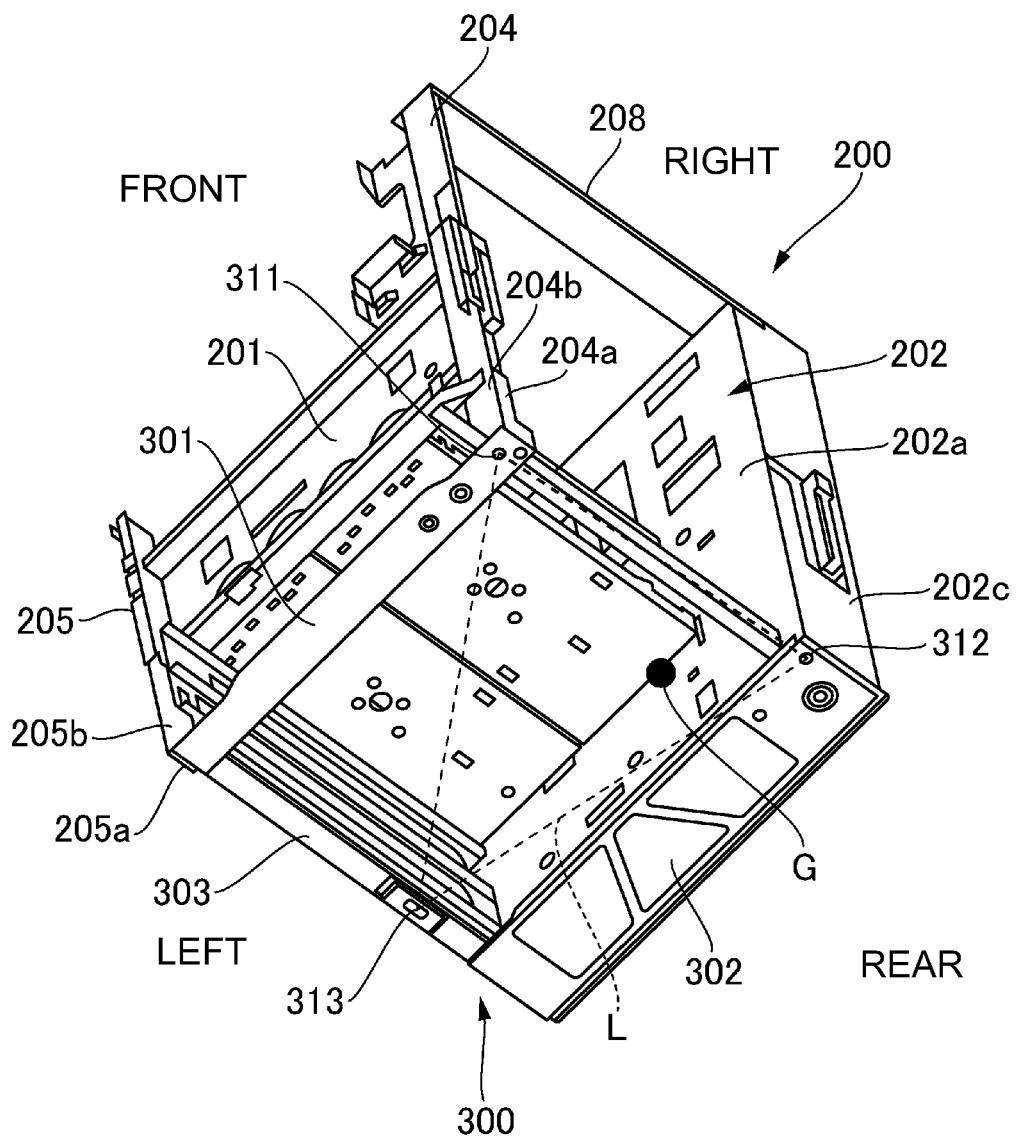
FIG. 4 is a perspective view of the frame for the image forming apparatus as seen from below in the First Embodiment.
Figure 5:
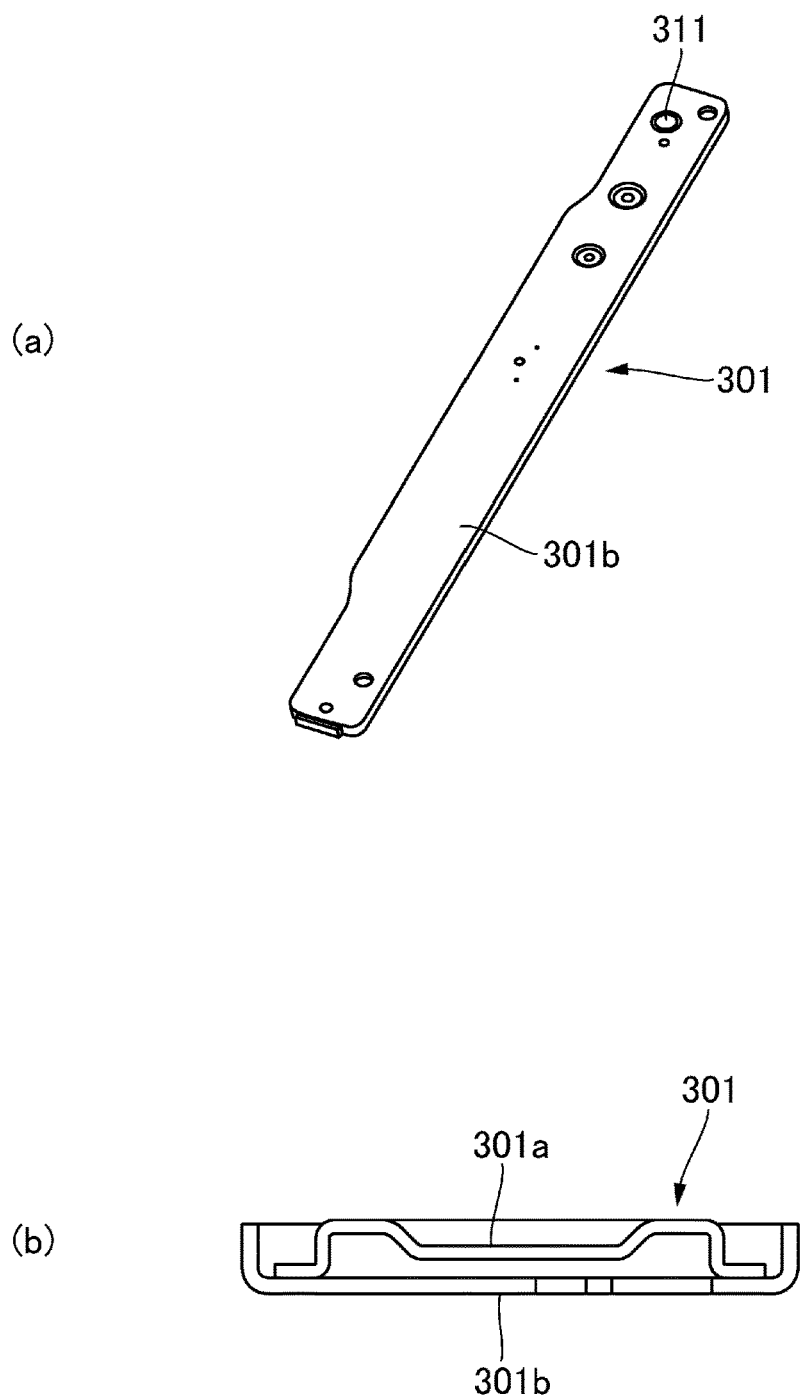
In FIG. 5, (a) is a perspective view of a lower front stay, and (b) is a sectional view of the lower front stay, in the First Embodiment.

The lower left stay 303 is, as shown in FIG. 4, disposed on the upper surfaces of the lower front stay 301 and the rear bottom stay 302 so as to extends onto the upper surfaces. In this state, a front end portion of the lower left stay 303 is disposed in contact with or closely to the first side wall 205a and the second side wall 205b of the left-side post 205. A rear end portion of the lower left stay 303 is disposed in contact with or closely to the left plate portion 202d of the rear-side plate 202 and the rear bottom stay 302. Accordingly, in this state, the lower left stay 303 is movable relative to the main assembly frame 200 in the up-down direction in a state in which the lower left stay 303 is positioned relative to the main assembly frame 200 with respect to the front-rear direction and the left-right direction.

However, as described above, the second supporting portion 313 provided on the lower left stay 303 is constituted separately from the lower left stay 303, and is movable relative to the lower left stay 303 in a state in which the second supporting portion 313 is positioned relative to the lower left stay 303 with respect to the front-rear direction and the left-right direction. For this reason, in this embodiment, the lower left stay 303 is fixed by welding to the first side wall 205a and the second side wall 205b of the left-side post 205 at the front end portion thereof and to the side plate portion 202a and the left plate portion 202b of the rear-side plate 202 at the rear end portion thereof. Thereafter, the second supporting portion 313 is, as described above, disposed movably relative to the lower left stay 303 in the up-down direction in a state in which the second supporting portion 313 is positioned relative to the lower left stay 303, and then is fixed to the lower left stay 303 after the height adjustment of the respective supporting portions is made.

The lower left stay 303 is disposed above the lower front stay 301 and the rear bottom stay 302. In this embodiment, as described above, the second supporting portion 313 provided on the lower left stay 303 disposed above the lower front stay 301 and the rear bottom stay 302 is prepared as the separate member from the lower left stay 303. This is because the lower left stay 303 is positioned above the lower front stay 301 and the rear bottom stay 302 and therefore a distance between the lower surface thereof and the installation surface is larger than those in the cases of other stays.

That is, in the case where the supporting portion for the lower left stay 303 is formed in a projected shape by subjecting the metal plate to the drawing similarly as in the cases of the lower front stay 301 and the rear bottom stay 302, the supporting portion is not readily projected correspondingly to the above-described distance. Accordingly, as in this embodiment, the supporting portion is prepared as the separate member, so that even when the distance from the installation surface is large, the formation of the projected portion can be easily made.

[Height Adjusting Method of Supporting Portions]

Figure 11:
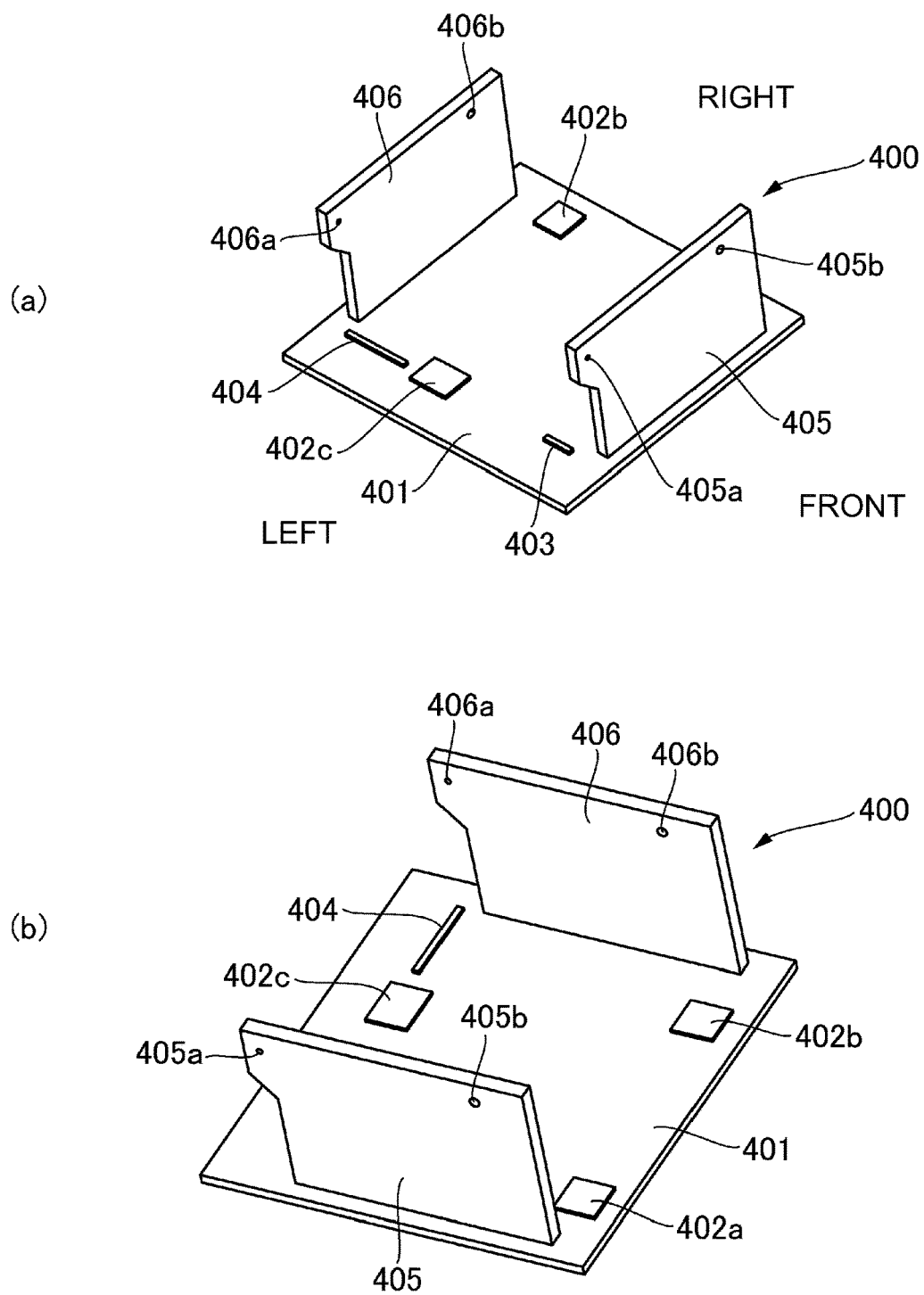
In FIG. 11, (a) is a perspective view of a positioning jig as seen from above, and (b) is a perspective view of the positioning jig as seen from above with an angle different from an angle in (a) of FIG. 11, in the First Embodiment.

Next, a method of positional adjustment (height adjustment) of the three supporting portions 311, 312, 313 with respect to the up-down direction will be described using FIGS. 11 and 12. As described above, each of the lower front stay 301, the rear bottom stay 302 and the lower left stay 303 is not provided with a positioning portion relative to the main assembly frame 200 with respect to the up-down direction. Accordingly, a positioning jig 400 for positioning each of the stays with respect to the up-down direction in order to adjust the height of each of the supporting portions will be described using (a) and (b) of FIG. 11. The positioning jig 400 is prepared by disposing, on an upper surface of a base 401, receiving portions 402a, 402b, 402c for the three supporting portions 311, 312, 313. These receiving portions 402a, 402b, 402c are regulated so that their upper surfaces are positioned in the same flat plane. On the upper surface of the base 401, a receiving portion 403 for the lower front stay 301 and a receiving portion 404 for the rear bottom stay 302 are disposed. Further, two walls 405, 406 are provided to stand from the upper surface of the base 401 with respect to the vertical direction, and are provided with two through holes 405a, 405b and two through holes 406a, 406b, respectively.

Figure 12:
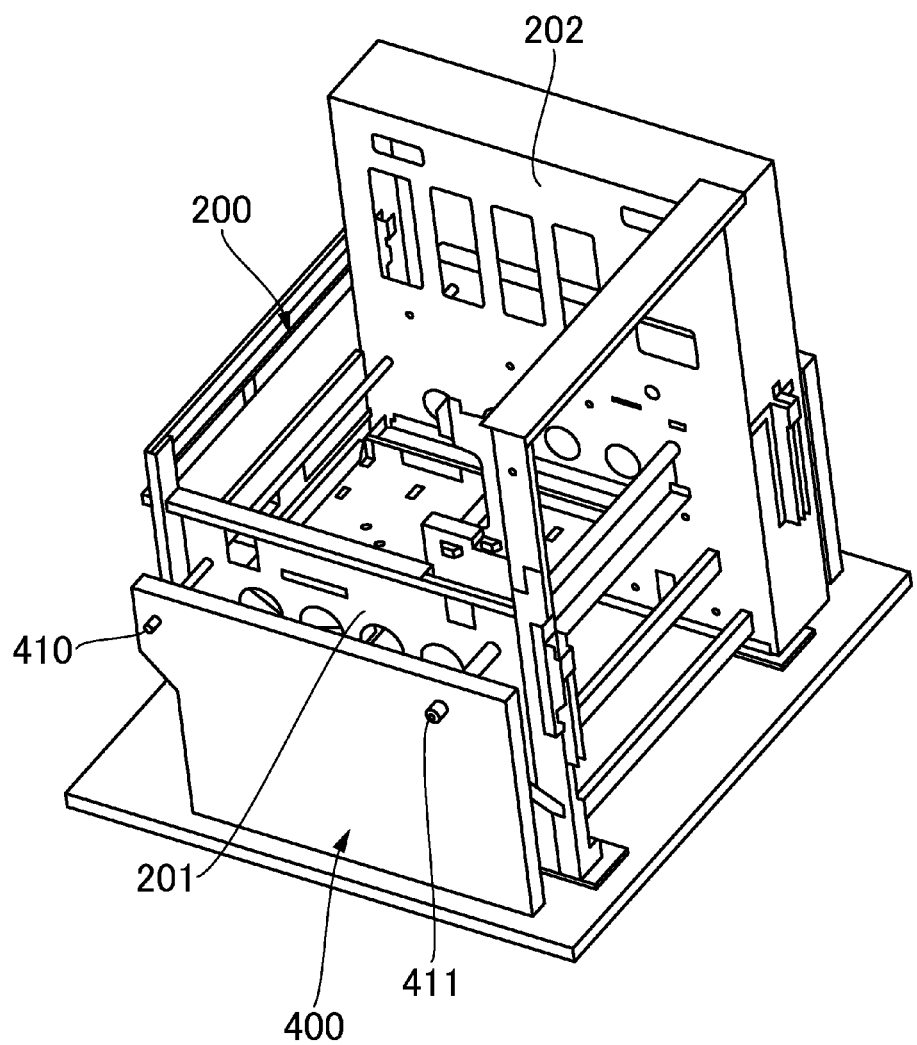
FIG. 12 is a perspective view of a state in which the frame for the image forming apparatus is disposed on the positioning jig, as seen from above in the First Embodiment.

When the respective stays are welded to the main assembly frame 200, as shown in FIG. 12, the main assembly frame 200 is installed on the positioning jig 400. The front-side plate 201 and the rear-side plate 202 of the main assembly frame 200 are provided with through holes at positions corresponding to the holes 405a, 405b, 406a, 406b. When the main assembly frame 200 is installed on the positioning jig 400, not only a supporting bar 410 is passed through the hole 405a, the associated through hole of the main assembly frame 200 and the hole 406a but also a supporting bar 411 is passed through the hole 405b, the associated through hole of the main assembly frame 200 and the hole 406b. As a result, the main assembly frame 200 is supported by the positioning jib 400 via the supporting bars 410, 411. Then, the respective stays are disposed at predetermined positions as described above so that the three supporting portions 311, 312, 313 are mounted on the receiving portions 402a, 402b, 402c, respectively.

The first supporting portion 311 and the third supporting portion 312 provided on the lower front stay 301 and the rear bottom stay 302, respectively, are disposed close to one end portions of the stays. For this reason, when the first supporting portion 311 and the third supporting portion 312 are only mounted on the receiving portions 402a, 402b, there is a possibility that the stays are disposed in an inclined state. Therefore, in this embodiment, on the upper surface of the base 401, at opposite end portions to the receiving portions 402a, 402b in a region where the lower front stay 301 and the rear bottom stay 302 are disposed, receiving portions 403, 404 for the lower front stay 301 and the rear bottom stay 302 are provided. Heights of the receiving portions 403, 404 are set in consideration of projection amounts of the first supporting portion 311 and the third supporting portion 312 from the associated stays. Thus, the respective stays are horizontally disposed in a state in which the first supporting portion 311 and the third supporting portion 312 are mounted on the receiving portions 402a, 402b and the lower front stay 301 and the rear bottom stay 302 are mounted on the receiving portions 403, 404.

On the other hand, in this state, the lower left stay 303 is mounted on the lower front stay 301 and the rear bottom stay 302. The second supporting portion 313 provided on the lower left stay 303 is mounted on a receiving portion 402c in a state in which the second supporting portion 313 is disposed on the lower left stay 303 at a predetermined position as described above. At this time, the respective stays 301, 302, 303 are movable relative to the main assembly frame 200 in the up-down direction in a state in which the second supporting portion 313 is positioned relative to the lower left stay 303 with respect to the front-rear direction and the left-right direction. For this reason, as described above, relative positions of the respective members with respect to the up-down direction are adjusted, so that the respective supporting portions 311, 312, 131 can be mounted on the receiving portions 402a, 402b, 402c. Further, at this time, the respective members are positioned with respect to the front-rear direction and the left-right direction and are movable only in the up-down direction, and therefore when a positioning operation is performed, the respective members do not readily deviate with respect to the front-rear direction or the left-right direction or do not readily lean with respect to the horizontal direction. Accordingly, the adjusting operation as described above is easily performed.

In this way, the supporting portions 311, 312, 313 are mounted on the receiving portions 402a, 402b, 402c, so that lower surfaces of the supporting portions are positioned on the same flat plane. Then, in this state, the stays 301, 302, 303 are welded to the associated posts or side plates of the main assembly frame 200, so that the stays are fixed to the main assembly frame 200. Further, the second supporting portion 313 is welded to the lower left stay 303, so that the second supporting portion 313 is fixed to the lower left stay 303. As a result, in a state in which the positioning of the supporting portions is made, the bottom 300 is fixed to the main assembly frame 200, so that the frame structure 130 is formed.

In summary, the frame structure 130 is manufactured by the following manufacturing method. First, the lower front stay 301 and the rear bottom stay 302 are disposed movably relative to the main assembly frame 200 in the up-down direction in a state in which the stays 301, 302 are positioned relative to the main assembly frame 200 with respect to the in-plane direction perpendicular to the up-down direction (first step). Then, at least one of the lower front stay 301 and the rear bottom stay 302 are moved in the up-down direction, so that the positional adjustment of the three supporting portions 311, 312, 313 is performed (second step). Finally, the lower front stay 301 and the rear bottom stay 302 are fixed to the main assembly frame (third step). In this embodiment, in the first step, also the lower left stay 303 is disposed movably relative to the main assembly frame 200 in a state in which the lower left stay 303 is positioned relative to the main assembly frame 200 with respect to the in-plane direction perpendicular to the up-down direction. In the second step, the second supporting portion 313 is moved relative to the lower left stay 303 in the up-down direction. In the third step, the second supporting portion 313 is fixed to the lower left stay 303.

In this embodiment, the frame structure 130 is manufactured using the positioning jig 400 as described above, so that the positioning of the supporting portions 311, 312, 313 can be easily performed. Further, the inside unit (such as the process cartridge 105) of the image forming apparatus 100 is positioned by the front-side plate 201 and the rear-side plate 202, and therefore the inside unit and a plane formed by the supporting portions 311, 312, 313 can be made parallel to each other. In actuality, a degree of parallelism of the process cartridge 105 with the supporting portions 311, 312, 313 can be roughly suppressed to 0.5 or less although it varies depending on accuracy of the jig.

As described above, according to this embodiment, even when the bottom 300 is constituted by the plurality of stays 301, 302, 303, a variation in positional relationship among the supporting portions 311, 312, 313 with respect to the up-down direction can be suppressed. The lower front stay 301 and the rear bottom stay 302 are movable relative to the main assembly frame 200 in the up-down direction in a state in which the stays 301, 302 are not fixed to the main assembly frame 200 but are positioned relative to the main assembly frame 200 with respect to the in-plane direction. For this reason, the lower front stay 301 and the rear bottom stay 302 are moved in the up-down direction, so that the height adjustment of the supporting portions 311, 312, 313 can be performed. In this embodiment, the second supporting portion 313 is movable in the up-down direction in a state in which the portion 313 is positioned relative to the lower left stay 303 with respect to the in-plane direction. In either case, after the height adjustment of the supporting portions 311, 312, 313 is performed, the stays or the supporting portions are fixed to the main assembly frame or the stays, so that a variation in positional relationship among the supporting portions 311, 312, 313 with respect to the up-down direction can be suppressed.

When the image forming apparatus 100 is mounted on, e.g., a horizontal surface of the floor as the installation surface, the inside unit is horizontal with respect to the direction of gravity, so that a function such as a toner feeding function subjected to the influence of the gravitation can be stabilized. Further, distortion of the frame structure 130 can be suppressed, so that not only stabilization of the feeding of the recording material by the recording material feeding portion 104 can be realized but also the deviation in positional relationship among the members such as the photosensitive drum can be suppressed, and thus it is possible to suppress generation of an image defect, improper operation and the like.

Second Embodiment

Figure 13:
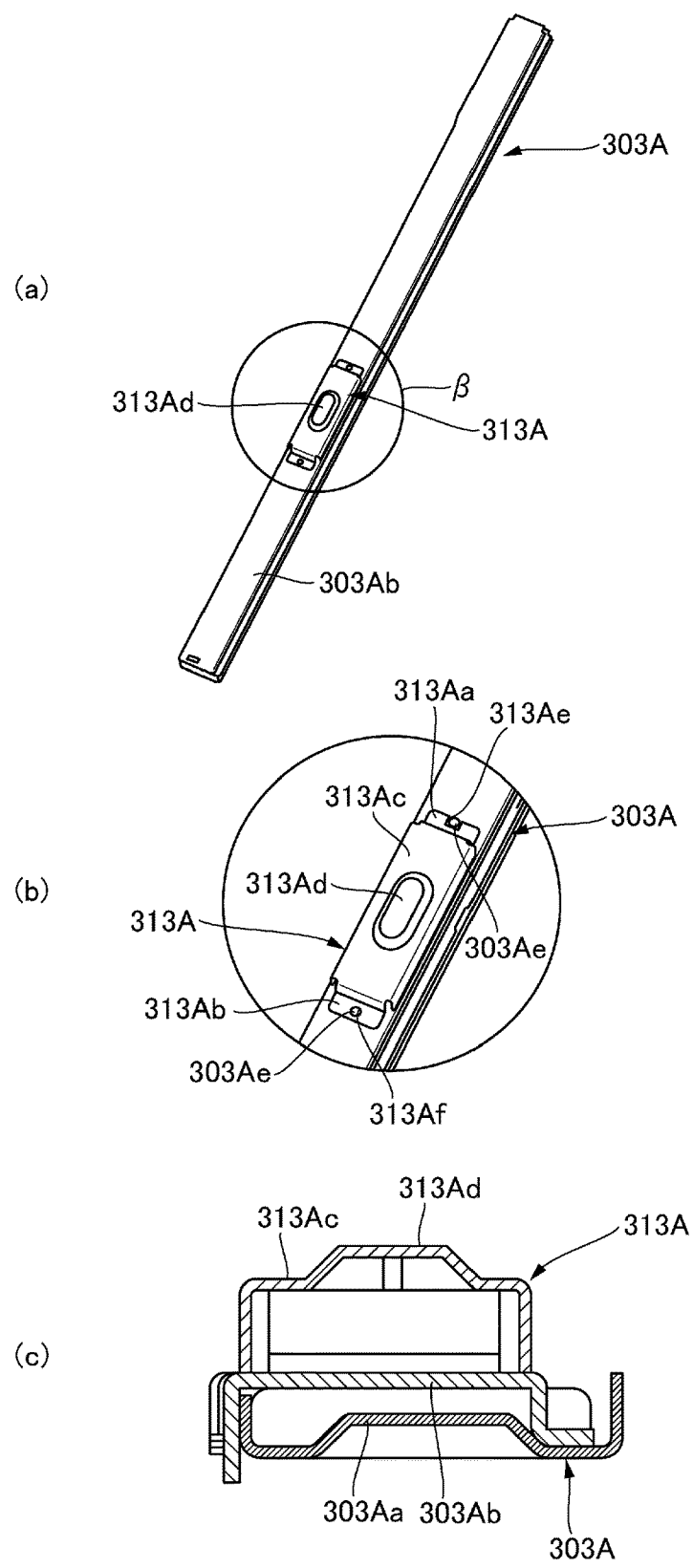
In FIG. 13, (a) is a perspective view of a lower left stay, (b) is an enlarged view of a β portion in (a) of FIG. 13, and (c) is a perspective view of the lower left stay, in Second Embodiment.
Figure 14:
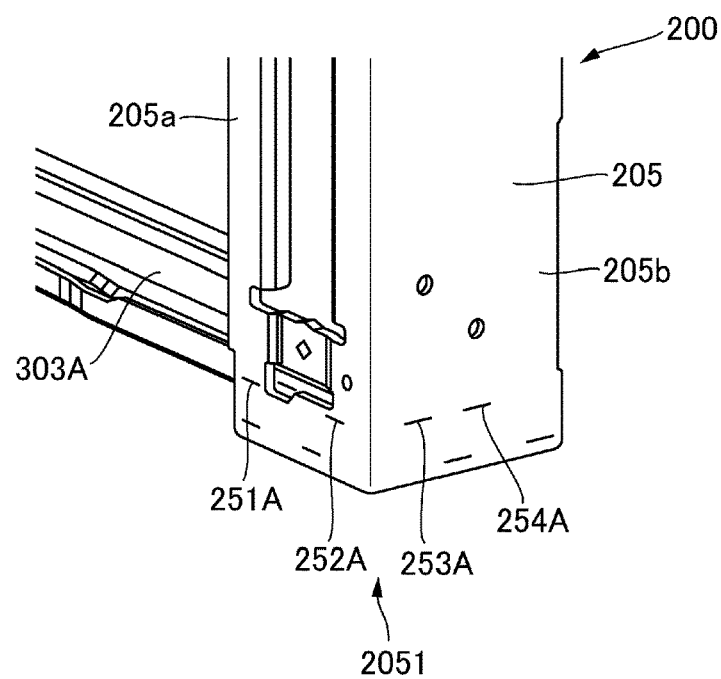
FIG. 14 is a perspective view of a connecting portion between the lower left stay and a left-side post as seen from above in the Second Embodiment.
Figure 15:
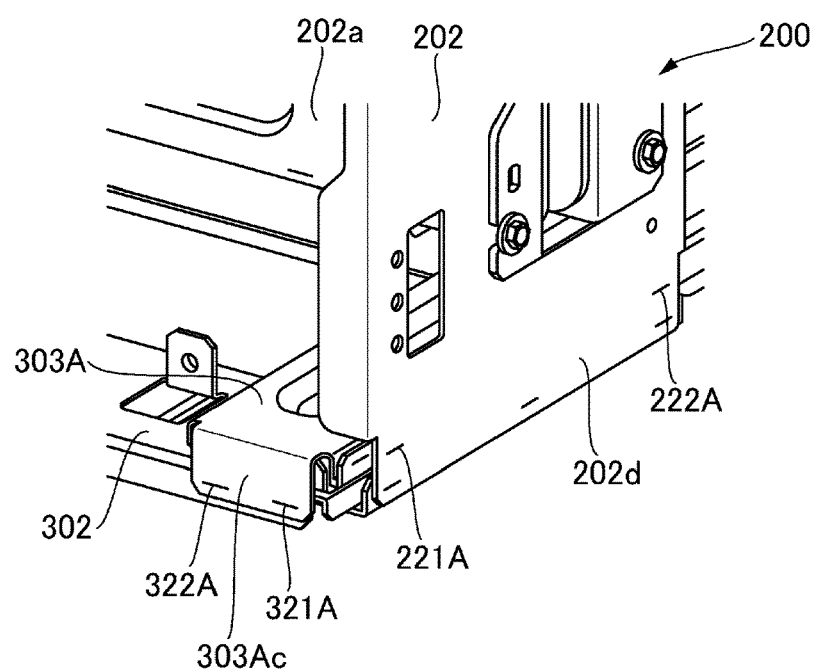
FIG. 15 is a perspective view of a connecting portion among the lower left stay, a rear-side plate and a rear bottom plate as seen from above in the Second Embodiment.

Second Embodiment of the present invention will be described using FIGS. 13 to 15. In the First Embodiment described above, the second supporting portion 313 provided on the lower left stay 303 was made movable in the up-down direction in the state in which the portion 313 was positioned with respect to the front-rear direction and the left-right direction. On the other hand, in this embodiment, a second supporting portion 313A is fixed to a lower left stay 303A in a state in which the portion 313A is positioned also with respect to the up-down direction. Other constitutions and actions are similar to those in the First Embodiment described above, and therefore redundant description and illustration are omitted or simplified and in the following, a portion different from the First Embodiment will be principally described.

The lower left stay 303A is, similarly as in the First Embodiment, constituted by combining a first plate member 303Aa and a second plate member 303Ab each formed by subjecting a metal plate to bending. The first plate member 303Aa and the second plate member 303Ab are similar to the first left member 303a and the second plate member 303b in the First Embodiment. Also a second supporting portion 313A in this embodiment is constituted as a separate member from the lower left stay 303 similarly as in the First Embodiment. However, the second supporting portion 313A is different from the second supporting portion 313 in the First Embodiment, and is fixed to a lower surface of the second plate member 303Ab constituting a lower surface side of the lower left stay 303A as shown in (a), (b) and (c) of FIG. 13.

For this reason, the second supporting portion 313A is formed by bending the metal plate, and includes a pair of abutting portions 313Aa, 313Ab, a connecting portion 313Ac and a contact portion 313Ad. The pair of abutting portions 313Aa, 313Ab are formed by being bent in one direction from ends of the connecting portion 313Ac with respect to the longitudinal direction (arranging direction or front-rear direction of the lower left stay 303A) and then by bending free ends in a direction substantially parallel to the connecting portion 313Ac. Further, a part of the connecting portion 313Ac is subjected to drawing so as to be pushed out downward, so that the contact portion 313Ad projecting downward more than other portion is formed on the lower surface of the connecting portion 313Ac. The contact portion 313Ad is similar to the contact portion 313d in the First Embodiment.

The lower left stay 303 includes a projected portion 303A as an engaging portion as shown in (b) of FIG. 7. The projected portion 303A is formed so as to project from each of two positions of the lower surface of the second plate member 303Ab. On the other hand, the second supporting portion 313A is provided with a cut-away portion 313Ae and a hole 313Af as portions-to-be-engaged engaging with the projected portion 303Ae. The cut-away portion 313Ae is cut away in the front-rear direction at the free end of the abutting portion 313Aa, so that one projected portion 303Ae can enter the cut-away portion 313Ae. The hole 313Af is formed by penetrating through a part of a free end portion of the abutting portion 313Ab, so that the other projected portion 303Ae can enter the hole 313Af.

Assembling of the second supporting portion 313A with the lower left stay 303A is made in the following manner. First, the pair of abutting portions 313Aa, 313Ab are abutted against the surface of the second plate member 303Ab while engaging the cut-away portion 313Ae and the hole 313Af with the projected portions 303Ae. By the engagement of the cut-away portion 313Ae and the hole 313Ap with the projected portions 303Ae, the second supporting portion 313A is positioned relative to the lower left stay 303A with respect to the in-plane direction (front-rear direction and front-rear direction). Further, the pair of abutting portions 313Aa, 313Ab are abutted against the surface of the second plate member 303Ab, so that the second supporting portion 313A is positioned relative to the lower left stay 303A with respect to the up-down direction. Then, in this state, the second supporting portion 313A is fixed to the lower left stay 303A by welding.

In the case of this embodiment, the abutting portions 313Aa, 313Ab of the second supporting portion 313A are abutted against the surface of the second plate member 303Ab, and therefore a contact area between the second supporting portion 313A and the second stay 303A can be sufficiently ensured. For this reason, when the image forming apparatus 100 is installed on the installation surface, a deformation of the second supporting portion 313A due to a load exerted on the second supporting portion 313A can be suppressed.

In this embodiment, as described above, the second supporting portion 313A is fixed to the lower left stay 303A in a state in which the portion 313A is positioned relative to the stay 303A with respect to the up-down direction in addition to the in-plane direction, and therefore the height adjustment of the second supporting portion 313A is made by the lower left stay 303A. Positioning and fastening of the lower left stay 303A to the main assembly frame 200 will be described using FIGS. 14 and 15.

The lower left stay 303A is, similarly as in the First Embodiment, mounted on the upper surfaces of the lower front stay 301 and the rear bottom stay 302 so as to extend onto the lower front stay 301 and the rear bottom stay 302. In this state, the front end portion of the lower left stay 303A is, as shown in FIG. 14, disposed so as to contact or approach the first side wall 205a and the second side wall 205b of the left-side post 205. The rear end portion of the lower left stay 303A is, as shown in FIG. 15, disposed so as to contact or approach the left plate portion 202d of the rear-side plate 202 and the rear bottom stay 302. The side plate portion 202a of the rear-side plate 202 is provided with the cut-away portion or the through hole through which the lower left stay 303A is passable, so that the rear end portion of the lower left stay 303A passes through the side plate portion 202a to reach a rear end edge portion of the rear bottom stay 302. The rear end portion of the lower left stay 303A is provided with a bent portion 303Ac bent from an end portion of the first plate member 303Aa, so that an inside surface of the bent portion 303Ac contacts the rear end edge portion of the rear bottom stay 302. As a result, the lower left stay 303A is movable relative to the main assembly frame 200 in the up-down direction in a state in which the stay 303A is positioned relative to the frame 200 with respect to the front-rear direction and the left-right direction. In this embodiment, the first side wall 205a and the second side wall 205b constitute a third positioning portion 2051.

To the lower left stay 303A, the second supporting portion 313A is fixed in advance as described above. Accordingly, for example, by using the positioning jig 400 described above, the positional adjustment (height adjustment) of the supporting portions 311, 312 other than the second supporting portion 313 with respect to the up-down direction is performed. Thereafter, the lower left stay 303A is fixed by welding to the rear-side post 205 at fastening portions 251A to 254A and to the rear-side plate 202 and the rear bottom stay 302 at fastening portions 221A, 222A, 321A, 322A.

Also in such a case in this embodiment, the second supporting portion 313A is prepared as the separate member from the lower left stay 303A. For this reason, similarly as in the First Embodiment, even when the distance between the lower left stay 303A and the left-side is large, the formation of the projected portion can be easily made.

Other Embodiments

In the above-described embodiments, the respective stays constituting the bottom were fixed to the main assembly frame by welding, but may also be fixed by another fastening means such as a screw. This is also true for the fixing between the supporting portions and the stays. In the above-described embodiments, the second supporting portion was prepared as the separate member from the lower left stay, but may also be formed integrally with the lower left stay similarly as in the cases of the first supporting portion and the third supporting portion.

In the embodiments described above, the 3 stays were made movable in the up-down direction in the state in which the stays were positioned relative to the main assembly frame with respect to the in-plane direction. However, in a state in which any one of the stays is made immovable relative to the main assembly frame in both of the in-plane direction and the up-down direction, other two stays may be made movable in the up-down direction in a state in which the two stays are positioned with respect to the in-plane direction. For example, in the Second Embodiment, the rear bottom stay 302 is fixed to the main assembly frame 200 and then the lower front stay 301 and the lower left stay 303 are moved in the up-down direction, so that heights of the first and second supporting portions 311, 313A may be made equal to the height of the third supporting portion 312.

In the First Embodiment described above, the second supporting portion 313 was made movable relative to the lower left stay 303 in the up-down direction, and other supporting portions were provided integrally with the associated stays. However, the three supporting portions may also be prepared as separate members from the associated stays so that the three supporting portions are movable in the up-down direction similarly as in the case of the second supporting portion 313. In this case, in a state in which the 3 stays are fixed to the main assembly frame, the respective supporting portions are disposed movably in the up-down direction in a state in which the supporting portions are positioned relative to the associated stays with respect to the in-plane direction. A constituent portion for positioning the first supporting portion 311 movably relative to the lower front stay 301 in the up-down direction is a first stay-side positioning portion. A constituent portion for positioning the third supporting portion 312 movably relative to the rear bottom stay 302 in the up-down direction is a third stay-side positioning portion. A constituent portion for positioning the second supporting portion 313 movably relative to the lower left stay 303 in the up-down direction is a second stay-side positioning portion. Then, after the height adjustment of the respective supporting portions, the supporting portions are fixed to the associated stays by welding. In this case, in a state in which any one of the supporting portions is fixed to or integrally formed with the associated stay, other two supporting portions may also be made movable in the up-down direction in a state in which the two supporting portions are positioned relative to the associated stays with respect to the in-plane direction.

Further, of the 3 stays and the three supporting portions, one stay and one supporting portion are fixed to the main assembly frame, and other two stays and other two supporting portions may also be made movable in the up-down direction. For example, in the First Embodiment, the rear bottom stay 302 is fixed to the main assembly frame 200, and then the lower front stay 301 is disposed movably in the up-down direction relative to the main assembly frame 200. In this case, the first positioning portion 2040 and the second positioning portion 2050 correspond to a main assembly-side positioning portion. Further, the second supporting portion 313 is disposed movably in the up-down direction relative to the lower left stay 303. Then, heights of the first and second supporting portions 311, 313 may also be made equal to the height of the third supporting portion 312.

In the above-described explanation, the so-called 3-point supporting structure in which the number of positions of the supporting portions for supporting the image forming apparatus on the installation surface was 3 was described, but the present invention is also applicable to a constitution, including 3 or more supporting portions, such as a 4-point supporting structure. For example, a constitution including three stays and four supporting portions will be considered. In this case, it is assumed that two supporting portions are provided on the same stay and other two supporting portions are provided on other two stays, respectively. Also in this case, similarly as in the above-described explanation, the respective stays or supporting portions are disposed movably in the up-down direction in a state in which the stays or supporting portions are positioned with respect to the in-plane direction, so that the height adjustment of the supporting portions can be performed. For example, the supporting portions are fixed to the associated stays in advance. At this time, the two supporting portions are fixed on the same stay, and therefore a degree of a variation in positional relationship of the two supporting portions with respect to the up-down direction is small. Accordingly, when other two supporting portions fixed on other two stays are subjected to the height adjustment relative to the two supporting portions fixed on the same stay, a variation in positional relationship among the four supporting portions with respect to the up-down direction can be suppressed.

Further, a constitution including 4 stays and four supporting portions will be considered. In this case, it is assumed that the four supporting portions are fixed to the four stays separately. Also in this case, of the four stays, any two stays are in the same relationship as that between the first stay and the second stay described above in the respective embodiments, so that the height adjustment can be made similarly as in the above-described embodiments. This is also true for the case where the supporting portions are made movable in the up-down direction relative to the stays.

The "supporting portion" referred to in the present invention includes not only the case where the single supporting portion contacts the installation surface at a single contact portion as described above in the embodiments but also the case where the single supporting portion contacts the installation surface at two or more contact portions. For example, an interval between the two contact portions is made small to constitute the single supporting portion. Here, in a constitution including three supporting portions, when any one of the supporting portions contacts the installation surface at two contact portions between which an interval is large, a resultant structure is consequently not different from the 4-point supporting structure. For this reason, in this case, the interval between the two contact portions is made small, for example, ⅓ of a length of the stay, with respect to the arranging direction, on which the associated supporting portion is provided.

According to the present invention, even when the bottom is constituted by the plurality of stays, a variation in positional relationship among the supporting portions with respect to the up-down direction can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-001113 filed on Jan. 6, 2015, which is hereby incorporated by reference herein in its entirety.

What is claimed is:

1. A manufacturing method of a frame structure for an image forming apparatus, the frame structure including a first stay including a first and a second welding surface welded to a frame assembly, a second stay including a third and a fourth welding surface welded to said frame assembly, a third stay including a fifth and a sixth welding surface welded to said frame assembly, at least one supporting portion provided on each of said first stay, said second stay and said third stay and configured to support said frame assembly on an installation surface in contact with said installation surface, a first opposing surface of said frame assembly opposing said first welding surface and welded with said first welding surface, a second opposing surface of said frame assembly opposing said second welding surface and welded with said second welding surface, a third opposing surface of said frame assembly opposing said third welding surface and welded with said third welding surface, a fourth opposing surface of said frame assembly opposing said fourth welding surface and welded with said fourth opposing surface, a fifth opposing surface of said frame assembly opposing said fifth welding surface and welded with said fifth welding surface, and a sixth opposing surface of said frame assembly opposing said sixth welding surface and welded with said sixth opposing surface, said frame assembly being welded with said first stay, said second stay and said third stay so that said frame assembly supported to said installation surface by a plurality of said supporting portions is not contact with said installation surface, said manufacturing method comprising:

a fixing step of fixing said frame assembly to a jig in a state in which said frame assembly is not contact with said installation surface;

a adjusting step of adjusting a position of said first stay to said frame assembly by moving said first stay in a vertical direction in a state in which said first welding surface contacts said first opposing surface and said second welding surface contacts said second opposing surface, adjusting a position of said second stay to said frame assembly by moving said second stay in the vertical direction in a state in which said third welding surface contacts said third opposing surface and said fourth welding surface contacts said fourth opposing surface, and adjusting a position of said third stay to said frame assembly by moving said third stay in the vertical direction in a state in which said fifth welding surface contacts said fifth opposing surface and said sixth welding surface contacts said sixth opposing surface; and a welding step of welding said first welding surface to said first opposing surface, welding said second welding surface to said second opposing surface, welding said third welding surface to said third opposing surface, welding said fourth welding surface to said fourth opposing surface, welding said fifth welding surface to said fifth opposing surface, and welding said sixth welding surface to said sixth opposing surface in a state in which said plurality of said supporting portions contact said installation surface and said frame assembly is not contact with said installation surface.

2. A manufacturing method according to claim 1, wherein in said welding step said first stay, said second stay, and said third stay are welded to said frame assembly so as not to contact each other.

3. A manufacturing method according to claim 1, wherein in said adjusting step the portions of said first stay, said second stay, and said third stay are adjusted to said frame assembly so that said frame assembly is horizontal.

4. A manufacturing method of a frame structure for an image forming apparatus, the frame structure including
   a first stay including a first and a second welding surface welded to a frame assembly,
   a second stay including a third and a fourth welding surface welded to said frame assembly,
   a plurality of supporting portions configured to support said frame assembly on an installation surface in contact with said installation surface, said plurality of supporting portions including at least one supporting portion provided on said first stay and including at least two supporting portions provided on said second stay,
   a first opposing surface of said frame assembly opposing said first welding surface and welded with said first welding surface,
   a second opposing surface of said frame assembly opposing said second welding surface and welded with said second welding surface,
   a third opposing surface of said frame assembly opposing said third welding surface and welded with said third welding surface, and
   a fourth opposing surface of said frame assembly opposing said fourth welding surface and welded with said fourth opposing surface,
   said frame assembly being welded with said first stay and said second stay so that said frame assembly supported to said installation surface by a plurality of said supporting portions is not contact with said installation surface, said manufacturing method comprising:
   a fixing step of fixing said frame assembly to a jig in a state in which said frame assembly is not contact with said installation surface;
   a adjusting step of adjusting a position of said first stay to said frame assembly by moving said first stay in a vertical direction in a state in which said first welding surface contacts said first opposing surface and said second welding surface contacts said second opposing surface and adjusting a position of said second stay to said frame assembly by moving said second stay in the vertical direction in a state in which said third welding surface contacts said third opposing surface and said fourth welding surface contacts said fourth opposing surface; and
   a welding step of welding said first welding surface to said first opposing surface, welding said second welding surface to said second opposing surface, welding said third welding surface to said third opposing surface, and welding said fourth welding surface to said fourth opposing surface in a state in which said plurality of said supporting portions contact said installation surface and said frame assembly is not contact with said installation surface.

5. A manufacturing method according to claim 4, wherein in said welding step said first stay and said second stay are welded to said frame assembly so as not to contact each other.

6. A manufacturing method according to claim 4, wherein in said adjusting step the portions of said first stay and said second stay are adjusted to said frame assembly so that said frame assembly is horizontal.

7. A manufacturing method of a frame structure for an image forming apparatus, the frame structure including
   a frame assembly including a first post extending in a vertical direction and a second post extending in the vertical direction at a distance from said first post with respect to a direction perpendicular to the vertical direction,
   a stay including a first welding surface welded to said first post and a second welding surface welded to said second post,
   a supporting portion provided on said stay between said first welding surface and said second welding surface and configured to support said frame assembly on an installation surface in contact with said installation surface,
   a first opposing surface of said first post opposing said first welding surface and welded with said first welding surface, and
   a second opposing surface of said second post opposing said second welding surface and welded with said second welding surface,
   said first post and said second post being welded with said stay so that said frame assembly supported to said installation surface by said supporting portion is not contact with said installation surface, said manufacturing method comprising:
   a fixing step of fixing said frame assembly to a jig in a state in which said frame assembly is not contact with said installation surface;
   a adjusting step of adjusting a position of said stay to said frame assembly by moving said stay in a vertical direction in a state in which said first welding surface contacts said first opposing surface and said second welding surface contacts said second opposing surface; and
   a welding step of welding said first welding surface to said first opposing surface and welding said second welding surface to said second opposing surface in a state in which said supporting portion contact said installation surface and said frame assembly is not contact with said installation surface.

* * * * *